US011570797B2

(12) United States Patent
Li et al.

(10) Patent No.: US 11,570,797 B2
(45) Date of Patent: Jan. 31, 2023

(54) METHOD AND APPARATUS OF HANDLING MULTIPLE DEVICE-TO-DEVICE RESOURCES IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 196 days.

(21) Appl. No.: 17/093,942

(22) Filed: Nov. 10, 2020

(65) Prior Publication Data

US 2021/0144736 A1 May 13, 2021

Related U.S. Application Data

(60) Provisional application No. 62/933,562, filed on Nov. 11, 2019.

(51) Int. Cl.
| | |
|---|---|
| *H04W 72/12* | (2009.01) |
| *H04W 72/02* | (2009.01) |
| *H04W 72/14* | (2009.01) |
| H04W 92/18 | (2009.01) |

(52) U.S. Cl.
CPC ....... *H04W 72/1263* (2013.01); *H04W 72/02* (2013.01); *H04W 72/14* (2013.01); *H04W 92/18* (2013.01)

(58) Field of Classification Search
CPC . H04W 72/1263; H04W 72/02; H04W 72/14; H04W 92/18
See application file for complete search history.

(56) References Cited

U.S. PATENT DOCUMENTS

| 11,115,958 | B2* | 9/2021 | Chae | H04L 5/0037 |
|---|---|---|---|---|
| 2018/0124621 | A1* | 5/2018 | Jung | H04W 76/14 |
| 2019/0306835 | A1* | 10/2019 | Hoang | H04W 72/0493 |
| 2020/0037343 | A1* | 1/2020 | He | H04L 1/1893 |
| 2020/0068488 | A1* | 2/2020 | Chae | H04L 5/0012 |
| 2020/0068609 | A1* | 2/2020 | Wang | H04W 72/0446 |
| 2021/0022091 | A1* | 1/2021 | Li | H04W 52/383 |
| 2021/0037468 | A1* | 2/2021 | Huang | H04W 76/28 |

(Continued)

FOREIGN PATENT DOCUMENTS

| WO | 2019028900 A1 | 2/2019 |
|---|---|---|
| WO | 2019160788 A1 | 8/2019 |
| WO | 2019185830 A1 | 10/2019 |

OTHER PUBLICATIONS

Corresponding European Patent Application No. 20206577.7, Extended European Search Report dated Apr. 12, 2021.

*Primary Examiner* — Ajay Cattungal
(74) *Attorney, Agent, or Firm* — Cooper Legal Group LLC

(57) ABSTRACT

A method and apparatus are disclosed. In an example from the perspective of a first device, the first device determines a second sidelink resource in a first sidelink slot in a carrier and/or a cell, wherein the first device has a configuration of a first sidelink resource pool in the carrier and/or the cell. The first device performs a procedure to select a first sidelink resource in the first sidelink resource pool, wherein the first sidelink resource is selected from among candidate sidelink resources, of the first sidelink resource pool, that are not in the first sidelink slot. The first device performs a first sidelink transmission on the first sidelink resource.

20 Claims, 10 Drawing Sheets

(56) References Cited

U.S. PATENT DOCUMENTS

| | | | |
|---|---|---|---|
| 2021/0051629 A1* | 2/2021 | Manolakos | H04L 5/0051 |
| 2021/0099901 A1* | 4/2021 | Huang | H04W 72/12 |
| 2021/0105787 A1* | 4/2021 | Park | H04W 72/085 |
| 2021/0144655 A1* | 5/2021 | Li | H04W 52/242 |
| 2022/0217680 A1* | 7/2022 | Li | H04W 76/23 |

* cited by examiner

500 ⟶

|  | Scenario 1 | Scenario 2 | Scenario 3 | Scenario 4 |
|---|---|---|---|---|
| Second sidelink resource | TX (Mode 1) | TX (Mode 2) | TX (Mode 2) | TX (Mode 1) |
| First sidelink resource | TX (Mode 2) | TX (Mode 1) | TX (Mode 2) | TX (Mode 1) |
| Applied Embodiment | Embodiment 1 | Embodiment 2 | Embodiment 1 Embodiment 2 | May not occur |

|  | Scenario 1 | Scenario 2 | Scenario 3 | Scenario 4 |
|---|---|---|---|---|
| Second sidelink resource | TX (Mode 1) | TX (Mode 2) | RX | RX |
| First sidelink resource | RX | RX | TX (Mode 1) | TX (Mode 2) |
| Applied Method | TX or RX | TX or RX+Embodiment 2 | TX or RX | TX or RX+Embodiment 2 |

FIG. 6

METHOD AND APPARATUS OF HANDLING MULTIPLE DEVICE-TO-DEVICE RESOURCES IN A WIRELESS COMMUNICATION SYSTEM

CROSS-REFERENCE TO RELATED APPLICATIONS

The present Application claims the benefit of U.S. Provisional Patent Application Ser. No. 62/933,562 filed on Nov. 11, 2019, the entire disclosure of which is incorporated herein in its entirety by reference.

FIELD

This disclosure generally relates to wireless communication networks, and more particularly, to a method and apparatus of handling multiple device-to-device resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device determines a second sidelink resource in a first sidelink slot in a carrier and/or a cell, wherein the first device has a configuration of a first sidelink resource pool in the carrier and/or the cell. The first device performs a procedure to select a first sidelink resource in the first sidelink resource pool, wherein the first sidelink resource is selected from among candidate sidelink resources, of the first sidelink resource pool, that are not in the first sidelink slot. The first device performs a first sidelink transmission on the first sidelink resource.

In an example from the perspective of a first device, the first device performs sidelink communication in a carrier and/or a cell. The first device selects and/or reserves a second sidelink resource in the carrier and/or the cell. The first device is scheduled and/or indicated to receive and/or transmit a first sidelink resource in the carrier and/or the cell. The first sidelink resource and the second sidelink resource overlap in time domain and do not overlap in frequency domain. The first device releases and/or drops the second sidelink resource. The first device performs resource reselection to select a third sidelink resource. The first device performs a sidelink transmission on the third sidelink resource.

In an example from the perspective of a first device, the first device performs a first procedure to select a first sidelink resource in a carrier and/or a cell, wherein the first sidelink resource is selected for transmitting a first data packet associated with a first priority. The first device performs a second procedure to select a second sidelink resource in the carrier and/or the cell, wherein the second sidelink resource is selected for transmitting a second data packet associated with a second priority. The first sidelink resource and the second sidelink resource overlap in time domain in a sidelink slot. The first device performs a first sidelink transmission based upon the first priority and the second priority. The first sidelink transmission is performed on the first sidelink resource to transmit the first data packet based upon the first priority of the first data packet being higher than the second priority of the second data packet, or the first sidelink transmission is performed on the second sidelink resource to transmit the second data packet based upon the second priority of the second data packet being higher than the first priority of the first data packet.

BRIEF DESCRIPTION OF THE DRAWINGS

FIG. 5 is a table associated with exemplary scenarios where different resource allocation modes are used for acquiring sidelink resources, according to one exemplary embodiment.

FIG. 6 is a table associated with various exemplary scenarios, according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.213 V15.4.0 (2018-12), "E-UTRA; Physical layer procedures (Release 15)"; 3GPP TS 36.214 V15.3.0 (20z18-09), "E-UTRA); Physical layer; Measurements (Release 15)"; 3GPP TS 36.212 V15.4.0 (2018-12), "E-UTRA); Physical layer; Multiplexing and channel coding (Release 15)"; 3GPP TS 36.211 V15.4.0 (2018-12), "E-UTRA); Physical layer; Physical channels and modulation (Release 15)"; RP-191723, "Revised WID on 5G V2X with NR sidelink", LG Electronics; R1-1810051, Final Report of 3GPP TSG RAN WG1 #94 v1.0.0 (Gothenburg, Sweden, 20-24 Aug. 2018); R1-1812101, Final Report of 3GPP TSG RAN WG1 #94bis v1.0.0 (Chengdu, China, 8-12 Oct. 2018); R1-1901482, Final Report of 3GPP TSG RAN WG1 #95 v0.1.0 (Spokane, USA, 12-16 Nov. 2018); R1-1901483, Final Report of 3GPP TSG RAN WG1 #AH 1901 v1.0.0 (Taipei, Taiwan, 21-25 Jan. 2019); R1-1905837, Final Report of 3GPP TSG RAN WG1 #96 v2.0.0 (Athens, Greece, 25 Feb.-1 Mar. 2019); R1-1905921, Final Report of 3GPP TSG RAN WG1 #96bis v1.0.0 (Xi'an, China, 8-12 Apr. 2019); R1-1907973, Final Report of 3GPP TSG RAN WG1 #97 v1.0.0 (Reno, USA, 13-17 May 2019); R1-1909942, Final Report of 3GPP TSG RAN WG1 #98 v1.0.0 (Prague, Czech Rep, 26-30 Aug. 2019); Draft Report of 3GPP TSG RAN WG1 #98bis v0.1.0 (Chongqing, China, 14-20 Oct. 2019); R2-1900002, Report of 3GPP TSG RAN2 #104 meeting, Spokane, USA. The standards and documents listed above are hereby expressly incorporated by reference in their entirety.

Figure 1:
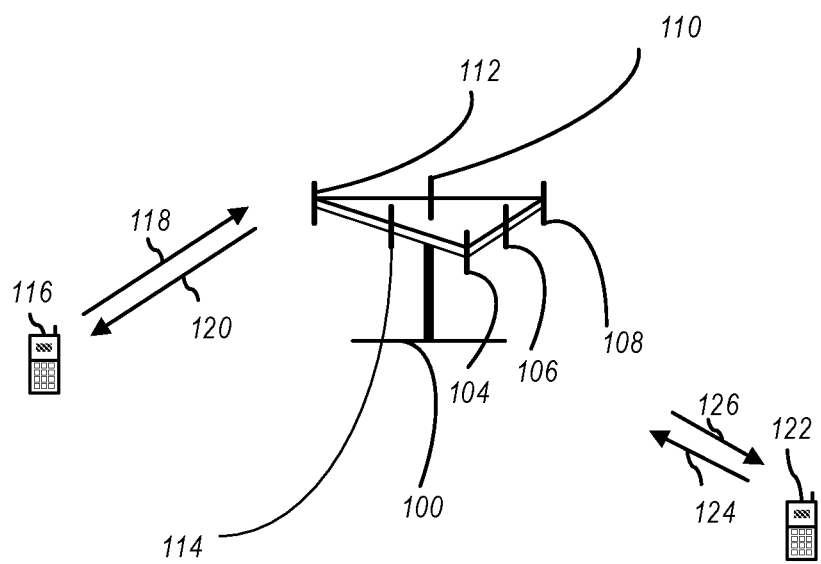
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
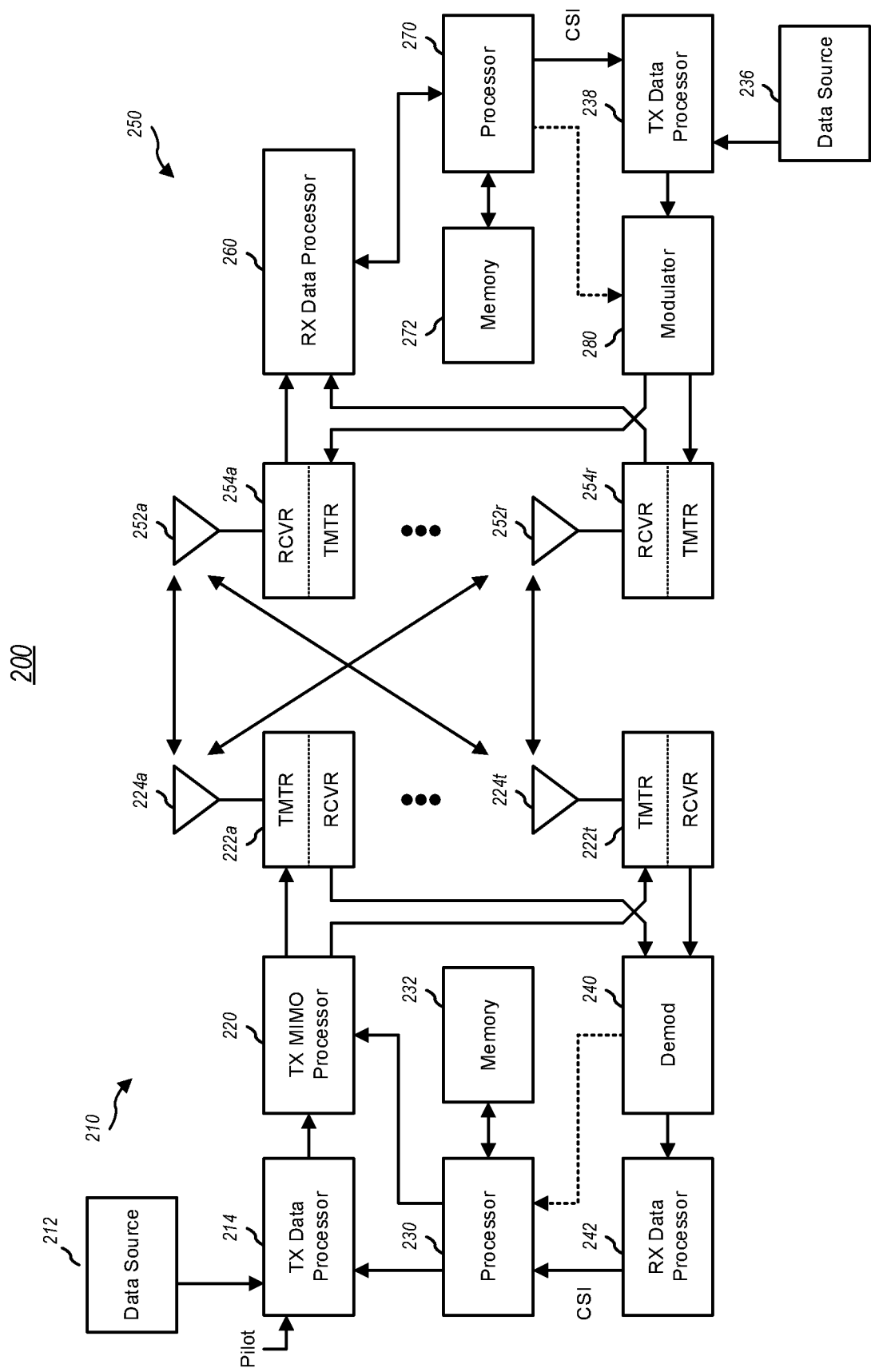
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
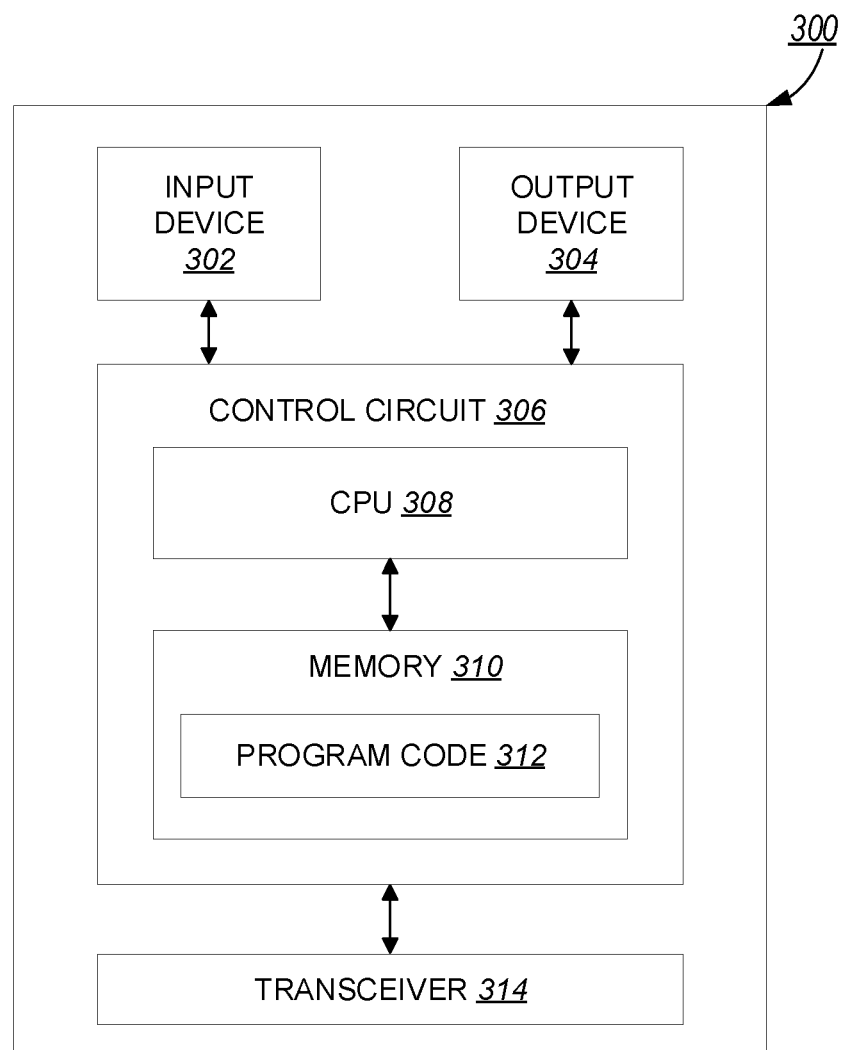
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
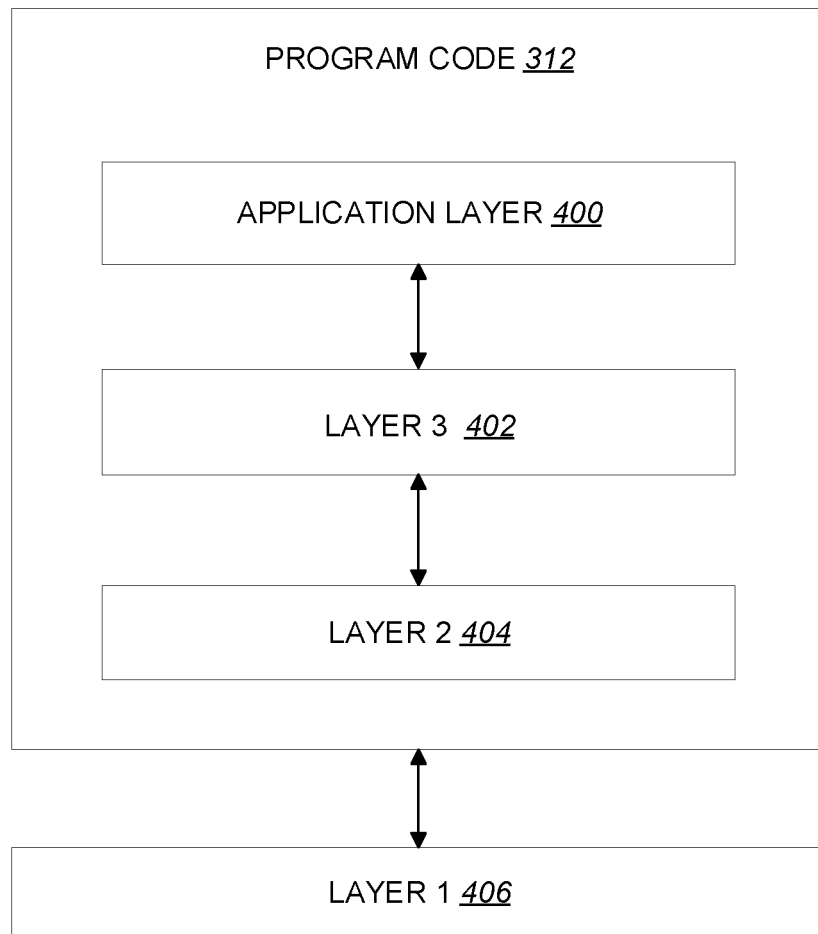
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.213 V15.4.0 (2018-12) specifies the UE procedure for Vehicle-to-Everything (V2X) transmission in LTE/LTE Advanced (LTE-A). The V2X transmissions may be performed as sidelink transmission mode 3 and/or sidelink transmission mode 4. Parts of 3GPP TS 36.213 V15.4.0 (2018-12) are quoted below:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1,2,3 or sidelink transmission mode 4. The physical sidelink control channel related procedures are described in Subclause 14.2.

14.1 Physical Sidelink Shared Channel Related Procedures 14.1.1 UE Procedure for Transmitting the PSSCH If the UE transmits SCI format 1 on PSCCH according to a PSCCH resource configuration in subframe n, then for the corresponding PSSCH transmissions of one TB for sidelink transmission mode 3,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

14.1.1.6 U E Procedure for Determining the Subset of Resources to be Reported to Higher Layers in PSSCH Resource Selection in Sidelink Transmission Mode 4 and in Sensing Measurement in Sidelink Transmission Mode 3 determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}=10*\text{SL\_RESOURCE\_RESELECTION\_COUNTER}$, where SL_RESOURCE_RESELECTION_COUNTER is provided by higher layers [11].

If partial sensing is not configured by higher layers then the following steps are used:
1) A candidate single-subframe resource for PSSCH transmission $R_{x,y}$ is defined as a set of $L_{subCH}$ contiguous sub-channels with sub-channel x+j in subframe $t_y^{SL}$ where j=0..., $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if ($prio_{TX}$) is provided by higher layers for $prio_{TX}$, otherwise $20 \leq T_2 \leq 100$. UE selection of $T_2$ shall fulfil the latency requirement. The total number of the candidate single-subframe resources is denoted by $M_{tota}$.

2) The UE shall monitor subframes $t_{n'-10\times P_{step}}^{SL}$, $t_{n'-10\times P_{step}+1}^{SL}, \ldots, t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j\times P_{rsvp\_TX}'=z+P_{step}\times k\times q$ where $j=0, 1, \ldots, C_{resel}-1$, $P_{rsvp\_TX}'=P_{step}\times P_{rsvp\_TX}/100$, k is any value allowed by the higher layer parameter restrictResourceReservationPeriod and $q=1,2, \ldots, Q$. Here, Q $$Q = \frac{1}{k} \text{ if } k < 1$$

and $n'-z \leq P_{step} \times k$, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.
6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX}, prio_{RX}}$.
   the SCI format received in subframe $t_m^{SL}$ or the same SCI format 1 which is assumed to be received in subframe(s) $t_{m+q=P_{step}\times P_{rsvp\_RX}}$ determines according to 14.1.1.4C the set of resource blocks and subframes which overlaps with $R_{x,y+j\times P'_{rsvp\_TX}}$ for $q = 1, 2, \ldots, Q$ and $j = 0, 1$, $\ldots, C_{resel} - 1$. Here, $Q = \frac{1}{P_{rsvp\_RX}}$ if $P_{rsvp\_RX} < 1$ and $n'-m \leq P_{step} \times P_{rsvp\_RX}$, where $t_{n'}^{SL}=n$ if subframe n belongs to the set $(t_0^{SL}, t_1^{SL}, \ldots t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.
7) If the number of candidate single-subframe resources remaining in the set $S_A$ is smaller than $0.2 \cdot M_{total}$, then Step 4 is repeated with $Th_{a,b}$ increased by 3 dB.
8) For a candidate single-subframe resource P Y remaining in the set $S_A$, the metric $E_{x,y}$ is defined as the linear average of S-RSSI measured in sub-channels x+k for $k=0, \ldots, L_{subCH}-1$ in the monitored subframes in Step 2 that can be expressed by $$t_{y-P_{step}*j}^{SL}$$

for a non-negative integer j if $P_{rsvp\_TX} \geq 100$, and $$t_{y-P_{rsvp\_TX}*j}^{SL}$$

for a non-negative integer j otherwise.
9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].
The UE shall report set $S_B$ to higher layers.

14.2 Physical Sidelink Control Channel Related Procedures
For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

| PDCCH/EPDCCH configured by SL-V-RNTI or SL-SPS-V-RNTI | |
|---|---|
| DCI format | Search Space |
| DCI format 5A | For PDCCH: Common and UE specific by C-RNTI<br>For EPDCCH: UE specific by C-RNTI |

The carrier indicator field value in DCI format 5A corresponds to v2x-InterFreqInfo.
14.2.1 UE Procedure for Transmitting the PSCCH
For sidelink transmission mode 3,
The UE shall determine the subframes and resource blocks for transmitting SCI format 1 as follows:
SCI format 1 is transmitted in two physical resource blocks per slot in each subframe where the corresponding PSSCH is transmitted.
If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL})$ and that starts not earlier than $$T_{DL} - \frac{N_{TA}}{2} \times T_S + (4+m) \times 10^{-3} \ldots$$

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL})$ and that starts not earlier than $$T_{DL} - \frac{N_{TA}}{2} \times T_S + (4+m) \times 10^{-3} \ldots$$

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$ one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTx}$ in subframe $t_{n+SF_{gap}}^{SL}$ where $SF_{gap}$ is the value indicated by "Time gap between initial transmission and retransmission" field in the configured sidelink grant, $L_{ReTx}$ corresponds to the value $n_{subCi}^{start}$ determined by the procedure in Subclause 14.1.1.4C with the RIV set to the value indicated by "Frequency resource location of the initial transmission and retransmission" field in the configured sidelink grant.

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate.

3GPP TS 36.214 V15.3.0 (2018-09) specifies some measurements for sidelink transmission in LTE/LTE-A. Parts of 3GPP TS 36.214 V15.3.0 (2018-09) are quoted below:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1 , . . . , 5 of the second slot of a subframe The reference point for the S-RSSI shall be the antenna connector of the UE. If receiver diversity is in use by the UE, the reported value shall not be lower than the corresponding S-RSSI of any of the individual diversity branches |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |

3GPP TS 36.212 V15.4.0 (2018-12) specifies CRC attachment for downlink shared channel and downlink control information in LTE/LTE-A. The downlink shared channel and downlink control information are for communication between network node and UE, i.e., Uu link. The sidelink shared channel and sidelink control information are for communication between UEs, i.e., PC5 link and/or sidelink. Parts of 3GPP TS 36.212 V15.4.0 (2018-12) are quoted below:

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

5.3.3.1.9A Format 5A DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$[\log_2 (N_{channel}^{SL})]$ bits as defined in subclause 14.1.1.4C of [3].

SCI format 1 fields according to 5.4.3.1.2:

Frequency resource location of initial transmission and retransmission.

Time gap between initial transmission and retransmission.

SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

SL SPS configuration index—3 bits as defined in subclause 14.2.1 of [3].

Activation/release indication—1 bit as defined in subclause 14.2.1 of [3].

5.4.3 Sidelink Control Information

An SCI transports sidelink scheduling information.

5.4.3.1.2 SCI Format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—[$\log_2 (N_{subchannel}^{SL}(N_{subchannel}^{SL}+1)/2)$] bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index—1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 V15.4.0 (2018-12) specifies generation for physical sidelink shared channel and physical sidelink control channel in LTE/LTE-A. The physical sidelink shared channel and physical sidelink control channel are for communication between devices, i.e., PC5 link and/or device-to-device link.

The physical sidelink shared channel (PSSCH) delivers data/transport block for sidelink shared channel (SL-SCH).

The physical sidelink control channel (PSCCH) delivers sidelink control information (SCI).

RP-191723 specifies the Justification and objective of a study item on NR V2X. Parts of RP-191723 are quoted below:

3 Justification

To expand the 3GPP platform to the automotive industry, the initial standard on support of V2V services was completed in September 2016. Enhancements that focusing on additional V2X operation scenarios leveraging the cellular infrastructure, are completed in March 2017 as 3GPP V2X phase 1 for inclusion in Release 14 LTE. In Rel-14 LTE V2X, a basic set of requirements for V2X service in TS 22.185 derived from TR 22.885 has been supported, which are considered sufficient for basic road safety service. Vehicles (i.e., UEs supporting V2X applications) can exchange their own status information through sidelink, such as position, speed and heading, with other nearby vehicles, infrastructure nodes and/or pedestrians. SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications may allow the vehicles following to be autonomously driven.

Extended Sensors enables the exchange of raw or processed data gathered through local sensors or live video data among vehicles, RSUs, devices of pedestrians and V2X application servers. The vehicles can enhance the perception of their environment beyond what their own sensors can detect and have a more holistic view of the local situation.

Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

Remote Driving enables a remote driver or a V2X application to operate a remote vehicle for those passengers who cannot drive themselves or a remote vehicle located in dangerous environments. For a case where variation is limited and routes are predictable, such as public transportation, driving based on cloud computing can be used. In addition, access to cloud-based back-end service platform can be considered for this use case group.

4 Objective 4.1 Objective of SI or Core Part WI or Testing Part WI

The objective of this work item is to specify radio solutions that are necessary for NR to support advanced V2X services (except the remote driving use case which was studied in TR 38.824) based on the study outcome captured in TR 38.885.

1. NR sidelink Specify NR sidelink solutions necessary to support sidelink unicast, sidelink groupcast, and sidelink broadcast for V2X services, considering in-network coverage, out-of-network coverage, and partial network coverage.

Support of sidelink signals, channels, bandwidth part, and resource pools [RAN1, RAN2]

Resource allocation [RAN1, RAN2]

Mode 1

NR sidelink scheduling by NR Uu and LTE Uu as per the study outcome

Mode 2

Sensing and resource selection procedures based on sidelink pre-configuration and configuration by NR Uu and LTE Uu as per the study outcome Support for simultaneous configuration of Mode 1 and Mode 2 for a UE Transmitter UE operation in this configuration is to be discussed after the design of mode 1 only and mode 2 only.

Receiver UE can receive the transmissions without knowing the resource allocation mode used by the transmitter UE.

[ . . . ] The solutions should cover both the operating scenario where the carrier(s) is/are dedicated to V2X services and the operating scenario where the carrier(s) is/are licensed spectrum and also used for NR Uu/LTE Uu operation.

NR sidelink design starts with frequencies in FR1, and NR sidelink in FR2 is supported by applying the design for FR1 and PT-RS to the numerologies agreed for FR2. No FR2 specific optimization is supported in this WI except PT-RS. No beam management is supported in this work.

For the scenarios of NR sidelink carrier, this work will consider a single carrier for the NR sidelink transmission and reception.

In RAN1 #94 meeting, RAN1 has some agreements about NR V2X, at least some of which are quoted below from R1-1810051:

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner RAN1 assumes that the physical layer knows the following information for a certain transmission belonging to a unicast or groupcast session. Note RAN1 has not made agreement about the usage of this information.

ID
  Groupcast: destination group ID, FFS: source ID
  Unicast: destination ID, FFS: source ID
  HARQ process ID (FFS for groupcast)
RAN1 can continue discussion on other information Agreements:
At least PSCCH and PSSCH are defined for NR V2X.
PSCCH at least carries information necessary to decode PSSCH.

Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
  Study further the following options:
    [ . . . ] Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)
    c) UE is configured with NR configured grant (type-1 like) for sidelink transmission
    d) UE schedules sidelink transmissions of other UEs In RAN1 #94bis meeting, RAN1 has some agreements about NR V2X, at least some of which are quoted below from R1-1812101:

Agreements:
Layer-1 destination ID is conveyed via PSCCH.

Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.

Agreements:
At least resource pool is supported for NR sidelink
Resource pool is a set of time and frequency resources that can be used for sidelink transmission and/or reception.
A resource pool is inside the RF bandwidth of the UE.
UE assumes a single numerology in using a resource pool.
Multiple resource pools can be configured to a single UE in a given carrier.

Agreements:
Sidelink sensing and resource selection procedures are studied for Mode-2(a)

In RAN1 #95 meeting, RAN1 has some agreements about NR V2X, at least some of which are quoted below from R1-1901482:

Agreements:
BWP is defined for NR sidelink
  In a licensed carrier, SL BWP is defined separately from BWP for Uu from the specification perspective.
  The same SL BWP is used for both Tx and Rx.
  Each resource pool is (pre)configured within a SL BWP.
  Only one SL BWP is (pre)configured for RRC idle or out of coverage NR V2X UEs in a carrier.
  For RRC connected UEs, only one SL BWP is active in a carrier. No signalling is exchanged in sidelink for activation and deactivation of SL BWP.
    Working assumption: only one SL BWP is configured in a carrier for a NR V2X UE
  Numerology is a part of SL BWP configuration.

Working Assumption:
Regarding PSCCH/PSSCH multiplexing, at least option 3 is supported for CP-OFDM.

Agreements:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
  Receiver UE generates HARQ-ACK if it successfully decodes the corresponding TB. It generates HARQ-NACK if it does not successfully decode the corresponding TB after decoding the associated PSCCH which targets the receiver UE.

Agreements:
It is supported to enable and disable SL HARQ feedback in unicast and groupcast.

Agreements:
Sensing procedure is defined as SCI decoding from other UEs and/or sidelink measurements
Resource (re)-selection procedure uses results of sensing procedure to determine resource(s) for sidelink transmission
  FFS timescale and conditions for resource selection or re-selection
  FFS resource selection/re-selection details for PSCCH and PSSCH transmissions
For Mode-2(a), the following schemes for resource selection are evaluated, including Semi-persistent scheme: resource(s) are selected for multiple transmissions of different TBs Dynamic scheme: resource(s) are selected for each TB transmission Agreements:
The following NR sidelink resource allocation techniques by NR Uu for mode-1 are supported:
Dynamic resource allocation
Configured grant.

In RAN1 #AH_1901 meeting, RAN1 has some agreements about NR V2X, at least some of which are quoted below from R1-1901483:

Agreements:
For time domain resources of a resource pool for PSSCH,
Support the case where the resource pool consists of non-contiguous time resources Agreements:
Layer-1 destination ID can be explicitly included in SCI
The following additional information can be included in SCI
Layer-1 source ID
HARQ process ID
NDI
RV Agreements:
Mode-2 supports the sensing and resource (re)-selection procedures according to the previously agreed definitions.

Agreements:
Sub-channel based resource allocation is supported for PSSCH

Agreements:
SCI decoding applied during sensing procedure provides at least information on sidelink resources indicated by the UE transmitting the SCI Agreements:
When NR Uu schedules NR SL mode 1, both type 1 and type 2 configured grants are supported for NR SL In RAN1 #96 meeting, RAN1 has some agreements about NR V2X, at least some of which are quoted below from R1-1905837:

Agreements:
For the operation regarding PSSCH, a UE performs either transmission or reception in a slot on a carrier.
NR sidelink supports for a UE:
A case where all the symbols in a slot are available for sidelink
Another case where only a subset of consecutive symbols in a slot is available for sidelink Agreements:
At least for sidelink HARQ feedback, NR sidelink supports at least a PSFCH format which uses last symbol(s) available for sidelink in a slot.

Agreements:
Blind retransmissions of a TB are supported for SL by NR-V2X

Agreements:
NR V2X Mode-2 supports reservation of sidelink resources at least for blind retransmission of a TB Agreements:
Mode-2 sensing procedure utilizes the following sidelink measurement
L1 SL-RSRP based on sidelink DMRS when the corresponding SCI is decoded In RAN1 #96bis meeting, RAN1 has some agreements about NR V2X, at least some of which are quoted below from R1-1905921:

Agreements:
At least for transmission perspective of a UE in a carrier, at least TDM between PSCCH/PSSCH and PSFCH is allowed for a PSFCH format for sidelink in a slot.

Agreements:
A dynamic grant provides resources for one or multiple sidelink transmissions of a single TB.
A configured grant (type-1, type-2) provides a set of resources in a periodic manner for multiple sidelink transmissions.
UE decides which TB to transmit in each of the occasions indicated by a given configured grant.

Agreements:
NR V2X supports an initial transmission of a TB without reservation, based on sensing and resource selection procedure
NR V2X supports reservation of a sidelink resource for an initial transmission of a TB at least by an SCI associated with a different TB, based on sensing and resource selection procedure
This functionality can be enabled/disabled by (pre-)configuration Working assumption:
For Tx/Tx overlap,
If packet priorities of both LTE and NR sidelink transmissions are known to both RATs prior to time of transmission subject to processing time restriction, then the packet with a higher relative priority is transmitted In RAN1 #97 meeting, RAN1 has some agreements about NR V2X, at least some of which are quoted below from R1-1907973:

Agreements:
Transmission of PSSCH is mapped onto contiguous PRBs only

Conclusion:
If two-stage SCI is supported, the following details are used.
Information related to channel sensing is carried on 1st-stage.
2nd-stage is decoded by using PSSCH DMRS.
Polar coding used for PDCCH is applied to 2nd-stage
Payload size for 1st-stage in two-stage SCI case is the same for unicast, groupcast, and broadcast in a resource pool.
After decoding the 1 st-stage, the receiver does not need to perform blind decoding of 2nd-stage.

Agreements:
For mode 1:
A dynamic grant by the gNB provides resources for transmission of PSCCH and PSSCH.

Agreements:
NR V2X Mode-2 supports resource reservation for feedback-based PSSCH retransmissions by signaling associated with a prior transmission of the same TB Agreements:
Resource selection window is defined as a time interval where a UE selects sidelink resources for transmission
The resource selection window starts T1≥0 after a resource (re-)selection trigger and is bounded by at least a remaining packet delay budget
FFS T1 value, whether it is measured in slots, symbols, ms, etc.

Agreements:
Support a sub-channel as the minimum granularity in frequency domain for the sensing for PSSCH resource selection
No additional sensing for other channels In RAN1 #98 meeting, RAN1 has some agreements about NR V2X, at least some of which are quoted below from R1-1909942:

Agreements:
In physical layer perspective, a (pre-)configured resource pool can be used for all of unicast, groupcast, and broadcast for a given UE.
There is no (pre-)configuration to inform which cast types are used for the resource pool.

Agreements:
Support 2-stage SCI
$1^{st}$ SCI is carried in PSCCH.

Agreements:
DCI indicates the slot offset between DCI reception and the first sidelink transmission scheduled by DCI.
The minimum gap between DCI and the first scheduled sidelink transmission is not smaller than the corresponding UE processing time.

Agreements:
At least for mode 2, The maximum number of SL resources $N_{MAX}$ reserved by one transmission including current transmission is [2 or 3 or 4]

Agreements:
In Mode-2, SCI payload indicates sub-channel(s) and slot(s) used by a UE and/or reserved by a UE for PSSCH (re-)transmission(s)
SL minimum resource allocation unit is a slot Working Assumption:
An indication of a priority of a sidelink transmission is carried by SCI payload
This indication is used for sensing and resource (re)selection procedures
This priority is not necessarily the higher layer priority Agreements:
The resource (re-)selection procedure includes the following steps
Step 1: Identification of candidate resources within the resource selection window
Step 2: Resource selection for (re-)transmission(s) from the identified candidate resources Agreements:
In Step 1 of the resource (re-)selection procedure, a resource is not considered as a candidate resource if:
The resource is indicated in a received SCI and the associated L1 SL-RSRP measurement is above an SL-RSRP threshold
The SL-RSRP threshold is at least a function of the priority of the SL transmission indicated in the received SCI and the priority of the transmission for which resources are being selected by the UE Agreements:
RAN1 understand that NR V2X priority field and PPPP are directly comparable i.e. the same numerical value has the same meaning in both the RATs.

In RAN1 #98bis meeting, RAN1 has some agreements about NR V2X, at least some of which are quoted below from Draft Report of 3GPP TSG RAN WG1 #98bis v0.1.0:

Agreements:
Support (pre-)configuration of a resource pool consisting of contiguous PRBs only Agreements:
For the number of bits of L1 IDs,
Layer-1 destination ID: 16 bits
Layer-1 source ID: 8 bits Agreements:
PSCCH for $1^{st}$ stage SCI with 2 and 3 symbols is supported in Rel-16.
FFS: other length(s) of symbols (e.g., all symbols)
The number of symbols above excludes AGC symbols if any
The number of PSCCH symbols is explicitly (pre-)configured per Tx/Rx resource pool Agreements:
The $2^{nd}$ stage SCI is carried within the resource of the corresponding PSSCH.
Scrambling operation for the $2^{nd}$ stage SCI is applied separately with PSSCH Agreements:
To signal the gap between DCI reception and the first sidelink transmission scheduled by DCI:
A table of values is configured by RRC.
DCI determines which of the configured values is used.

Working Assumption:
Each transmission in a resource provided by a configured grant contains PSCCH and PSSCH.

Agreements:
Resource (re-)selection procedure supports re-evaluation of Step 1 and Step 2 before transmission of SCI with reservation
The re-evaluation of the (re-)selection procedure for a resource reservation signalled in a moment 'm' is not required to be triggered at moment >'m-T3' (i.e. resource reselection processing time needs to be ensured)
FFS condition to change resource(s) from previous iteration to resource(s) from current iteration
FFS relationship of T1 and T3, if any
FFS whether to handle it differently for blind and feedback-based retransmission resources Agreements:
In Step 1, initial L1 SL-RSRP threshold for each combination of $p_i$ and $p_j$ is (pre-)configured, where $p_i$—priority indication associated with the resource indicated in SCI and $p_j$—priority of the transmission in the UE selecting resources Agreements:
Support a resource pre-emption mechanism for Mode-2
A UE triggers reselection of already signaled resource(s) as a resource reservation in case of overlap with resource(s) of a higher priority reservation from a different UE and, SL-RSRP measurement associated with the resource reserved by that different UE is larger than an associated SL-RSRP threshold
Only the overlapped resource(s) is/are reselected In RAN2 #104 meeting, RAN2 has some agreements about NR V2X, at least some of which are quoted below from R2-1900002:
RAN2 will support the case a UE can be configured to perform both mode-1 and mode-2 at the same time assuming RAN1 does not have concern on it. FFS on the scenario which it is applicable.
Some or all of the following terminology and assumptions may be used hereafter.
BS: a network central unit and/or a network node in New Radio Access Technology (NR) which is used to control one or more transmission and reception points (TRPs) which are associated with one or more cells. Communication between BS and TRP(s) is via fronthaul. BS may be referred to as central unit (CU), eNB, gNB, and/or NodeB.
Cell: a cell is composed of one or more associated TRPs, i.e. coverage of the cell is composed of coverage of some and/or all associated TRP(s). One cell is controlled by one BS. Cell may be referred to as TRP group (TRPG).

NR-Physical Downlink Control Channel (PDCCH): A channel carries downlink control signal which is used to control communication between a UE and a network side. A network transmits NR-PDCCH on a configured control resource set (CORESET) to the UE.

Uplink-control signal (UL-control signal): A UL-control signal may be at least one of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.

Slot: a scheduling unit in NR. Slot duration may be 14 OFDM symbols.

For LTE Vehicle-to-Everything (V2X) and/or Pedestrian-to-Everything (P2X) transmission, there are at least two transmission modes: one is scheduled via network, such as sidelink transmission mode 3 (such as discussed in 3GPP TS 36.213 V15.4.0 (2018-12)); another is sensing-based transmission, such as sidelink transmission mode 4 (such as discussed in 3GPP TS 36.213 V15.4.0 (2018-12)). Since the sensing-based transmission is not scheduled via network, the UE may be required to perform sensing before selecting a resource for sidelink transmission, in order to avoid resource collision and/or interference with (e.g., from and/or to) other UEs.

A UE can determine a valid resource set based upon a sensing procedure or a partially sensing procedure. The valid resource set may be reported to higher layers for transmission from the UE. The UE may select one or more valid resources from the valid resource set to perform transmission from the UE. In some examples, the transmission from the UE may be PSSCH transmission. Alternatively and/or additionally, the transmission from the UE may be sidelink transmission. Alternatively and/or additionally, the transmission from the UE may be device-to-device transmission.

For NR V2X transmission, there are at least two sidelink resource allocation modes defined for NR-V2X sidelink communication (such as discussed in R1-1810051). In a first sidelink resource allocation mode, called mode 1 (e.g., resource allocation mode 1), a base station and/or a network node can schedule one or more sidelink resources to be used by a UE for one or more sidelink transmissions, which is a concept that may be similar to sidelink transmission mode 3 in LTE and/or LTE-A (such as discussed in 3GPP TS 36.214 V15.3.0 (2018-09)). In a second sidelink resource allocation mode, called mode 2 (e.g., resource allocation mode 2), a UE may determine one or more sidelink transmission resources (such as without a base station and/or a network node scheduling the one or more sidelink transmission resources) within (e.g., from among) sidelink resources configured by a base station and/or a network node and/or pre-configured sidelink resources, which is a concept that may be similar to sidelink transmission mode 4 in LTE and/or LTE-A (such as discussed in 3GPP TS 36.214 V15.3.0 (2018-09)).

For network scheduling mode, such as mode 1, the network node may transmit a sidelink (SL) grant on Uu interface for scheduling resources of PSCCH and/or PSSCH. The V2X UE may perform PSCCH transmissions and/or PSSCH transmissions on PC5 interface, in response to the received sidelink grant. The Uu interface corresponds to a wireless interface for communication between a network and a UE. The PC5 interface corresponds to a wireless interface for communication (e.g., direct communication) between UEs and/or devices.

For UE selection mode (e.g., UE autonomous selection mode), such as mode 2, since a transmission resources is not scheduled via a network, the UE may require performing sensing (e.g., the UE may be required to perform sensing) before and/or while selecting a resource for transmission (e.g., sensing-based transmission), in order to avoid resource collision and interference with (e.g., from and/or to) other UEs. For example, the UE may perform a sensing procedure before and/or while selecting a resource for transmission. Based upon the sensing procedure, the UE can determine a valid resource set. For example, the valid resource set may be determined and/or identified based upon one or more results (e.g., measurements) of the sensing procedure. The valid resource set may be reported to higher layers (e.g., higher layers of the UE). The UE may select one or more valid resources from the valid resource set to perform one or more sidelink transmissions from the UE. The one or more sidelink transmissions from the UE may comprise one or more PSCCH transmissions and/or one or more PSSCH transmissions.

Since NR V2X has requirements of high reliability and/or high throughput, NR V2X may be considered to support sidelink HARQ (SL HARQ) feedback for unicast and/or groupcast. Accordingly, in some examples, in response to a transmitter UE transmitting a sidelink data transmission to a receiver UE, the receiver UE may transmit sidelink HARQ feedback to the transmitter UE (such as via a Physical Sidelink Feedback Channel (PSFCH) transmission).

In LTE V2X, since only sidelink broadcast is supported, a transmitter UE may be configured to operate in mode 3 or mode 4. However, to support different services and scenarios in NR V2X, NR V2X may support unicast, groupcast, and broadcast sidelink transmission. Alternatively and/or additionally, a transmitter UE can simultaneously have multiple links/connections to multiple receiver UEs. The term "link/connection" as used herein may correspond to a link and/or a connection. For example, a transmitter UE can have a unicast link/connection to a first device (e.g., a front vehicle in front of the transmitter UE) and another unicast link/connection to a second device (e.g., a behind vehicle behind the transmitter UE). In another example, a transmitter UE can have a unicast link/connection to a first device (e.g., a front vehicle in front of the transmitter UE) and a groupcast link/connection to a set of devices (e.g., a vehicle platoon). In some examples, sidelink broadcast may be supported as well, such as simultaneously and/or concurrently with unicast and/or groupcast. In some examples, the multiple links/connections may be configured with respective resource allocation modes based upon respective service requirements and/or based upon whether paired UEs are in the same cell coverage. In RAN2 #104, it is agreed that NR V2X may support the case where a UE can be configured to perform operations according to both NR sidelink resource allocation mode 1 and NR sidelink resource allocation mode 2 simultaneously and/or concurrently. Thus, whether or not simultaneous mode 1 and mode 2 is supported in a sidelink resource pool, a transmitter UE can operate in mode 1 and mode 2 simultaneously and/or concurrently, where the transmitter UE may operate with mode 1 for one or more links/connections and operate with mode 2 for one or more links/connections. In another example, in a time unit (e.g., a slot, a subframe and/or other time unit), a transmitter UE could be configured (e.g., pre-configured) with at least two resource pools, wherein the at least two resource pools occupy different frequency range Physical Resource Blocks (PRBs) and/or sub-channels and/or the at least two resource pools are associated with mode 1 and/or mode 2. In this example, in the time unit, the transmitter UE may perform sidelink transmission using mode 1 and mode 2 simultaneously and/or concurrently.

In current V2X systems, the mode 2 is operated only with consideration on sidelink resources in a corresponding TX resource pool. The mode 1 may be operated directly based upon network scheduling. Accordingly, separate sidelink resource allocation operations without interaction may encounter NR PSSCH TX/TX overlap, even in a same carrier/cell. The term "carrier/cell" as used herein may correspond to a carrier and/or a cell. NR PSSCH TX/TX overlap may correspond to a scenario in which two sidelink resources (such as for sidelink transmission) overlap in time domain. In an example, a first sidelink resource scheduled by a sidelink grant may overlap in the same sidelink slot with a second sidelink resource selected and/or reserved by a transmitter UE. In an example, a first sidelink resource selected and/or reserved by the transmitter UE in a first resource pool may overlap in the same sidelink slot with a second sidelink resource selected and/or reserved by the transmitter UE in a second resource pool. The transmitter UE may need to check whether or not multiple PSSCHs in a carrier (in a same sidelink slot) can be supported and/or determine a number of PSSCHs in the carrier (in the same sidelink slot) can be supported. Even if multiple PSSCHs in a carrier (in a same sidelink slot) are supported, a scenario in which transmit power exceeds a maximum allowed transmit power due to multiple PSSCHs may need to be handled.

In some examples, it is possible to encounter NR PSSCH TX/RX overlap, such as where a first sidelink resource selected and/or reserved by a UE in a first resource pool may overlap, in the same sidelink slot, with a second sidelink resource indicated and/or reserved by a paired UE in a second resource pool. In an example, after a UE selects and/or reserves a first sidelink resource, the UE may receive a sidelink control information from a paired UE, wherein the sidelink control information indicates and/or reserves a second sidelink resource for UE reception. If the first sidelink resource overlaps with the second sidelink resource in the same sidelink slot, the UE may need to select transmission on the first sidelink resource or reception on the second sidelink resource, such as due to half-duplex restriction (e.g., the UE may not be able to perform both the transmission on the first sidelink resource and the reception on the second sidelink resource in the same sidelink slot).

To handle NR PSSCH TX/TX and/or NR PSSCH TX/RX overlap in the same sidelink slot in a carrier, data packet priorities comparison between overlapped PSSCHs may be introduced.

For NR PSSCH TX/TX overlap in the same sidelink slot, the PSSCH delivering/transmitting a data packet with a higher relative priority may be transmitted by a UE. The term "delivering/transmitting" as used herein may correspond to a delivering and/or transmitting. The UE may drop a PSSCH transmission delivering/transmitting a data packet with a lower relative priority and/or the UE may perform power scaling (e.g., reduce transmit power) on the PSSCH transmission delivering the data packet with the lower relative priority.

For NR PSSCH TX/RX overlap in the same sidelink slot, a UE may transmit or receive in the same sidelink slot based upon priorities of corresponding data packets (e.g., the UE may determine to transmit in the same sidelink slot or to receive in the same sidelink slot based upon the priorities). For example, a priority of a data packet for transmission by the UE may be indicated and/or informed by a higher layer. A priority of a data packet for reception by the UE may be indicated and/or informed by a priority indication in a received sidelink control information. The UE may receive the sidelink control information from a paired UE before the overlapped sidelink slot, wherein the sidelink control information reserves the PSSCH resource for the UE reception.

Alternatively and/or additionally, to handle NR PSSCH TX/TX and/or NR PSSCH TX/RX overlap in the same sidelink slot in a carrier, one or more interactions, mechanisms and/or methods on resource allocation between different links/connections for a UE may be introduced. The one or more interactions, mechanisms and/or methods may be introduced and/or applied to avoid occurrence of NR PSSCH TX/TX and/or TX/RX overlap in the same sidelink slot in a carrier. Alternatively and/or additionally, in scenarios in which multiple PSSCHs in the same sidelink slot in a carrier can be supported by a UE, the one or more interactions, mechanisms and/or methods may be introduced and/or applied to avoid NR PSSCH TX/TX overlap that exceeds a threshold number of PSSCHs (e.g., a restricted number and/or an allowed number of PSSCHs) in the same sidelink slot in a carrier.

Techniques, interactions, mechanisms and/or methods are provided herein for handling NR PSSCH TX/TX and/or NR PSSCH TX/RX overlap in the same sidelink slot in a carrier.

Example Embodiment 1

In Example Embodiment 1, when a first device performs sidelink resource selection/re-selection procedure for selecting a first sidelink resource in a first sidelink resource pool, the first device may exclude candidate sidelink resources in a first sidelink slot (e.g., all sidelink resources in the first sidelink slot) in the first sidelink resource pool for selecting the first sidelink resource. For example, when a first device performs sidelink resource selection/re-selection procedure for selecting a first sidelink resource in a first sidelink resource pool, the first device may not select a sidelink resource, in a first sidelink slot in the first sidelink resource pool, as the first sidelink resource. The term "sidelink resource selection/re-selection procedure" as used herein may correspond to a sidelink resource selection procedure (such as performed for selecting a sidelink resource) and/or a sidelink resource re-selection procedure (such as performed for re-selecting a sidelink resource).

In some examples, when a first device performs sidelink resource selection/re-selection procedure for selecting a first sidelink resource in a first sidelink resource pool, the first device may exclude sidelink resources in a first sidelink slot (e.g., all sidelink resources in the first sidelink slot) in the first sidelink resource pool from being candidate sidelink resources for selecting the first sidelink resource (e.g., the sidelink resources in the first sidelink slot may not be counted and/or considered as candidate sidelink resources from which the first device selects the first sidelink resource).

In some examples, the first device may have a reserved/scheduled sidelink transmission or reception in the first sidelink slot (e.g., a sidelink transmission or a sidelink reception may have already been reserved and/or scheduled for performance by the first device in the first sidelink slot), before the first device performs the sidelink resource selection/re-selection procedure for selecting the first sidelink resource. For example, the first device may exclude the sidelink resources in the first sidelink slot from being candidate sidelink resources due to the reserved/scheduled sidelink transmission or reception in the first sidelink slot.

In some examples, the first device may have, achieve and/or arrange an allowed number of reserved/scheduled sidelink transmissions in the first sidelink slot before the first device performs the sidelink resource selection/re-selection procedure for selecting the first sidelink resource. For example, the first device may exclude the sidelink resources in the first sidelink slot from being candidate sidelink resources due to the allowed number of reserved/scheduled sidelink transmissions in the first sidelink slot. In some examples, if the first device performs the sidelink resource selection/re-selection procedure and selects the first sidelink resource in the first sidelink slot, reserved/scheduled sidelink transmissions (in a carrier) in the first sidelink slot may exceed the allowed number of reserved/scheduled sidelink transmissions. In some examples, the allowed number of reserved/scheduled sidelink transmissions may be associated with a capability of the first device (e.g., the allowed number of reserved/scheduled sidelink transmissions may correspond to a number of sidelink transmissions that the first device is capable of transmitting in a sidelink slot, such as simultaneously and/or concurrently). In some examples, if a number of reserved/scheduled sidelink transmissions in the first sidelink slot does not meet (e.g., is less than) the allowed number of reserved/scheduled sidelink transmissions, the first device may not exclude candidate resources in the first sidelink slot and/or the first device may select a candidate resource in the first sidelink slot (e.g., as the first sidelink resource), provided that selecting a candidate resource in the first sidelink slot does not cause the number of reserved/scheduled sidelink transmissions in the first sidelink slot to exceed the allowed number of reserved/scheduled sidelink transmissions.

In some examples, the first sidelink slot corresponds to a sidelink slot, wherein, before the first device performs the sidelink resource selection/re-selection procedure for selecting the first sidelink resource, the first device selects and/or reserves a second sidelink resource in the sidelink slot. In some examples, the second sidelink resource is selected and/or reserved by the first device. In some examples, the first device operates in device selection mode (e.g., NR sidelink resource allocation mode 2) to acquire the second sidelink resource. In some examples, the second sidelink resource is in a second sidelink resource pool. In some examples, the first device may perform a second sidelink transmission on the second sidelink resource. In some examples, the second sidelink resource pool is different from the first sidelink resource pool. Alternatively and/or additionally, the second sidelink resource pool and the first sidelink resource pool may be the same. In some examples, the second sidelink resource pool and the first sidelink resource pool are in a same carrier/cell. In some examples, one or more resources in the first resource pool are in a same carrier/cell as one or more resources in the second resource pool.

Alternatively and/or additionally, the first sidelink slot may correspond to a sidelink slot, wherein, before the first device performs the sidelink resource selection/re-selection procedure for selecting the first sidelink resource, the first device is scheduled and/or indicated with a second sidelink resource in the sidelink slot. In some examples, the second sidelink resource is scheduled and/or indicated by a sidelink grant received from a network node. In some examples, the first device operates in network scheduling mode (e.g., NR sidelink resource allocation mode 1) to acquire the second sidelink resource. In some examples, the first device may perform a second sidelink transmission on the second sidelink resource. In some examples, the second sidelink resource is in a second sidelink resource pool. In some examples, the second sidelink resource pool is different from the first sidelink resource pool. Alternatively and/or additionally, the second sidelink resource pool and the first sidelink resource pool may be the same. In some examples, the second sidelink resource pool and the first sidelink resource pool are in a same carrier/cell. In some examples, one or more resources in the first resource pool are in a same carrier/cell as one or more resources in the second resource pool.

Alternatively and/or additionally, the first sidelink slot may correspond to a sidelink slot, wherein, before the first device performs the sidelink resource selection/re-selection procedure for selecting the first sidelink resource, the first device receives and/or indicates a second sidelink control information which reserves a second sidelink resource in the sidelink slot. In some examples, the second sidelink control information is transmitted from a second device to one or more devices comprising the first device. In some examples, a destination identity in the second sidelink control information is associated with one or more devices comprising the first device. In some examples, the first device may receive a second sidelink transmission, from the second device, on the second sidelink resource. In some examples, the second sidelink resource is in a second sidelink resource pool. In some examples, the second sidelink resource pool is different from the first sidelink resource pool. Alternatively and/or additionally, the second sidelink resource pool and the first sidelink resource pool may be the same. In some examples, the second sidelink resource pool and the first sidelink resource pool are in a same carrier/cell. In some examples, one or more resources in the first resource pool are in a same carrier/cell as one or more resources in the second resource pool.

In some examples, the first device operates in device selection mode (e.g., NR sidelink resource allocation mode 2) to acquire the first sidelink resource. The first sidelink resource may be selected for delivering/transmitting a first data packet associated with a first priority.

In some examples, a second sidelink transmission may be associated with a second data packet associated with a second priority. The second sidelink transmission may be associated with a second sidelink resource in the first sidelink slot.

In some examples, the first device may select and/or reserve the second sidelink resource in the first sidelink slot for transmission of the second sidelink transmission for delivering/transmitting the second data packet. For example, the first device may perform the second sidelink transmission, on the second sidelink resource, for delivering/transmitting the second data packet associated with the second priority. Alternatively and/or additionally, the second sidelink resource is scheduled and/or indicated, for transmission of the second sidelink transmission for delivering/transmitting the second data packet, by a sidelink grant received from a network node. For example, the first device may perform the second sidelink transmission, on the second sidelink resource, for delivering/transmitting the second data packet associated with the second priority.

Alternatively and/or additionally, the first device may receive a second sidelink control information which reserves the second sidelink resource in the first sidelink slot for reception of the second sidelink transmission for delivering/transmitting the second data packet (such as delivering/ transmitting the second data packet to one or more devices comprising the first device). For example, the first device may receive the second sidelink transmission, on the second sidelink resource, for delivering/transmitting the second data packet associated with the second priority. In some examples, the second priority is indicated by the second sidelink control information.

In some examples, the first priority may be lower than (e.g., relatively lower than) the second priority. In some examples, when the first device performs the sidelink resource selection/re-selection procedure for selecting the first sidelink resource in the first sidelink resource pool, if the first priority is lower than (e.g., relatively lower than) the second priority, the first device may exclude candidate sidelink resources in the first sidelink slot (e.g., all candidate sidelink resources in the first sidelink slot) for selecting the first sidelink resource. Alternatively and/or additionally, when the first device performs the sidelink resource selection/re-selection procedure for selecting the first sidelink resource in the first sidelink resource pool, if the first priority is lower than (e.g., relatively lower than) the second priority, the first device may exclude sidelink resources in the first sidelink slot (e.g., all sidelink resources in the first sidelink slot) from being candidate sidelink resources for selecting the first sidelink resource.

In some examples, the first priority may be higher than (e.g., relatively higher than) the second priority. In some examples, when the first device performs the sidelink resource selection/re-selection procedure for selecting the first sidelink resource in the first sidelink resource pool, if the first priority is higher than (e.g., relatively higher than) the second priority, the first device may not exclude candidate sidelink resources in the first sidelink slot for selecting the first sidelink resource. Alternatively and/or additionally, when the first device performs the sidelink resource selection/re-selection procedure for selecting the first sidelink resource in the first sidelink resource pool, if the first priority is higher than (e.g., relatively higher than) the second priority, the first device may not exclude sidelink resources in the first sidelink slot (e.g., all sidelink resources in the first sidelink slot) from being candidate sidelink resources for selecting the first sidelink resource.

Alternatively and/or additionally, when the first device performs the sidelink resource selection/re-selection procedure for selecting the first sidelink resource in the first sidelink resource pool, if the first priority is higher than (e.g., relatively higher than) the second priority, the first device may exclude candidate sidelink resources in the first sidelink slot (e.g., all candidate sidelink resources in the first sidelink slot) for selecting the first sidelink resource. Alternatively and/or additionally, when the first device performs the sidelink resource selection/re-selection procedure for selecting the first sidelink resource in the first sidelink resource pool, if the first priority is higher than (e.g., relatively higher than) the second priority, the first device may exclude sidelink resources in the first sidelink slot (e.g., all sidelink resources in the first sidelink slot) from being candidate sidelink resources for selecting the first sidelink resource.

Alternatively and/or additionally, when the first device performs the sidelink resource selection/re-selection procedure for selecting the first sidelink resource in the first sidelink resource pool, the first device may exclude candidate sidelink resources in the first sidelink slot (e.g., all candidate sidelink resources in the first sidelink slot) for selecting the first sidelink resource, without consideration/comparison of the first priority and/or the second priority (e.g., the first device may exclude the candidate sidelink resources in the first sidelink slot regardless of whether the first priority is higher or lower than the second priority). Alternatively and/or additionally, when the first device performs the sidelink resource selection/re-selection procedure for selecting the first sidelink resource in the first sidelink resource pool, the first device may exclude sidelink resources in the first sidelink slot (e.g., all sidelink resources in the first sidelink slot) from being candidate sidelink resources for selecting the first sidelink resource, without consideration/comparison of the first priority and/or the second priority (e.g., the first device may exclude the sidelink resources in the first sidelink slot from being candidate sidelink resources regardless of whether the first priority is higher or lower than the second priority).

In some examples, when the first device performs the sidelink resource selection/re-selection procedure for selecting the first sidelink resource in the first sidelink resource pool, if the first priority is higher than (e.g., relatively higher than) the second priority, the first device may take and/or identify and/or consider the second sidelink resource as one candidate sidelink resource in the first sidelink slot. In some examples, the first device may take and/or identify and/or consider sidelink resources in the first sidelink resource pool in the first sidelink slot as candidate sidelink resources. In an example, the first device may ignore whether or not the first sidelink slot comprises an already reserved and/or scheduled sidelink resource (such as the second sidelink resource). Alternatively and/or additionally, the first device may consider the second sidelink resource to be one of the candidate sidelink resources from which the first device can select the first sidelink resource in the first sidelink resource pool. In some examples, when and/or if the first device selects a sidelink resource in the first sidelink slot as the first sidelink resource (where the selected sidelink resource may partly overlap, fully overlap or not overlap with the second sidelink resource in frequency domain), the first device may perform a second sidelink resource selection/re-selection procedure for selecting a sidelink resource (e.g., a new sidelink resource) as the second sidelink resource, such as for transmission of the second sidelink transmission. Alternatively and/or additionally, when and/or if the first device selects a sidelink resource in the first sidelink slot as the first sidelink resource, the first device may not perform a second sidelink resource selection/re-selection procedure for selecting a sidelink resource as the second sidelink resource (e.g., no compensation).

In some examples, the candidate sidelink resources in the first sidelink slot are resources that can be used for delivering the first data packet. In some examples, one, some and/or all of the candidate resources in the first sidelink slot may be used for delivering the first data packet.

In some examples, when the first device identifies candidate sidelink resources within a resource selection window, the first device excludes candidate sidelink resources in a first sidelink slot (e.g., all candidate sidelink resources in the first sidelink slot) for selecting the first sidelink resource (e.g., the candidate sidelink resources in the first sidelink slot may be excluded from a set of candidate resources from which the first device selects the first sidelink resource). In some examples, when the first device identifies candidate sidelink resources within the resource selection window, the first device excludes sidelink resources in the first sidelink slot (e.g., all sidelink resources in the first sidelink slot) from being candidate sidelink resources for selecting the first sidelink resource (e.g., the first device does not consider the sidelink resources in the first sidelink slot to be candidate sidelink resources from which the first device selects the first sidelink resource).

In some examples, the second sidelink control information may schedule a third sidelink transmission from the second device to one or more devices comprising the first device, wherein the first device receives the second sidelink control information and the third sidelink transmission in the first sidelink slot. In some examples, the first device may or may not perform L1 Sidelink Reference Signal Received Power (SL-RSRP) measurement on a sidelink resource of the third sidelink transmission scheduled by the second sidelink control information. In some examples, when the first device performs sidelink resource selection/re-selection procedure for selecting a first sidelink resource in a first sidelink resource pool, the first device may exclude candidate sidelink resources in the first sidelink slot (e.g., all candidate sidelink resources in the first sidelink slot) for selecting the first sidelink resource without consideration of an associated L1 SL-RSRP measurement on the sidelink resource of the third sidelink transmission. Alternatively and/or additionally, when the first device performs sidelink resource selection/re-selection procedure for selecting the first sidelink resource in the first sidelink resource pool, the first device may exclude sidelink resources in the first sidelink slot (e.g., all sidelink resources in the first sidelink slot) from being candidate sidelink resources for selecting the first sidelink resource without consideration of an associated L1 SL-RSRP measurement on the sidelink resource of the third sidelink transmission.

Example Embodiment 2

In Example Embodiment 2, when a first device is scheduled and/or indicated with a first sidelink resource, if the first sidelink resource overlaps with a second sidelink resource (in time domain) that is reserved and/or selected before the first device is scheduled and/or indicated with the first sidelink resource, the first device may perform a resource pre-emption operation, such as an operation corresponding to a resource pre-emption mechanism (e.g., the resource pre-emption operation may be performed on the second sidelink resource). In some examples, the first device may ignore, release and/or drop the second sidelink resource (e.g., the first device may ignore, release and/or drop the reservation of the second sidelink resource). The first device may trigger resource re-selection for acquiring a new sidelink resource. For example, the first device may select (e.g., re-select) the new sidelink resource to replace the second sidelink resource. In some examples, the first sidelink resource and/or the second sidelink resource are utilized and/or reserved by the first device for performing (e.g., transmitting) sidelink transmissions. Alternatively and/or additionally, the first sidelink resource may be utilized for receiving a sidelink transmission that is transmitted to one or more devices comprising the first device, and/or the second sidelink resource may be utilized and/or reserved by the first device for performing a sidelink transmission (e.g., transmitting the sidelink transmission to one or more devices).

In some examples, the second sidelink resource is reserved and/or selected by the first device. In some examples, the first device performs a sidelink resource selection/re-selection procedure for selecting the second sidelink resource. In some examples, the first device operates in device selection mode (e.g., NR sidelink resource allocation mode 2) to acquire the second sidelink resource.

In some examples, the second sidelink resource is in a second sidelink resource pool.

In some examples, the first sidelink resource is in a first sidelink resource pool.

In some examples, the first device may transmit or receive a first sidelink transmission on the first sidelink resource.

In some examples, the first device may receive a sidelink grant from a network node (such as transmitted to the first device), wherein the sidelink grant schedules and/or indicates the first sidelink resource. In some examples, the first device operates in network scheduling mode (e.g., NR sidelink resource allocation mode 1) to acquire the first sidelink resource. In some examples, the first device may transmit the first sidelink transmission on the first sidelink resource. In some examples, the first device may select and/or reserve the second sidelink resource before the first device receives the sidelink grant for scheduling and/or indicating the first sidelink resource.

Alternatively and/or additionally, the first sidelink resource may be selected by the first device. In some examples, the first device operates in device selection mode (e.g., NR sidelink resource allocation mode 2) to acquire the first sidelink resource. In some examples, the first device may transmit the first sidelink transmission on the first sidelink resource.

Alternatively and/or additionally, the first device may receive a first sidelink control information which reserves and/or indicates the first sidelink resource. In some examples, the first sidelink control information is transmitted from a second device to one or more devices comprising the first device. In some examples, the first device may receive the first sidelink transmission, from the second device, on the first sidelink resource. In some examples, the first device may select the second sidelink resource before the first device receives the first sidelink control information for reserving and/or indicating the first sidelink resource.

In some examples, before the first device receives the sidelink grant for scheduling and/or indicating the first sidelink resource or before the first device receives the first sidelink control information for reserving and/or indicating the first sidelink resource, the first device may signal the reservation of the second sidelink resource. In some examples, before the first device receives the sidelink grant for scheduling and/or indicating the first sidelink resource or before the first device receives the first sidelink control information for reserving and/or indicating the first sidelink resource, the first device may transmit a third sidelink control information, which reserves and/or indicates the second sidelink resource.

Alternatively and/or additionally, before the first device receives the sidelink grant for scheduling and/or indicating the first sidelink resource or before the first device receives the first sidelink control information for reserving and/or indicating the first sidelink resource, the first device may not signal the reservation of the second sidelink resource. In some examples, before the first device receives the sidelink grant for scheduling and/or indicating the first sidelink resource or before the first device receives the first sidelink control information for reserving and/or indicating the first sidelink resource, the first device may not transmit a third sidelink control information, which reserves and/or indicates the second sidelink resource.

In some examples, the first sidelink resource overlaps with the second sidelink resource. In some examples, overlap of the first sidelink resource and the second sidelink resource corresponds to the first sidelink resource and the second sidelink resource being in the same first sidelink slot.

Alternatively and/or additionally, overlap of the first sidelink resource and the second sidelink resource may correspond to the first sidelink resource and the second sidelink resource (fully or partially) overlapping in time domain.

In some examples, the first sidelink resource and the second sidelink resource partly or fully overlap in frequency domain. In some examples, the second sidelink resource pool and the first sidelink resource pool are the same.

Alternatively and/or additionally, the first sidelink resource and the second sidelink resource may not overlap in frequency domain. In some examples, the second sidelink resource pool is different from the first sidelink resource pool. Alternatively and/or additionally, the second sidelink resource pool may be the same as the first sidelink resource pool. In some examples, a resource (e.g., 1 Physical Resource Block (PRB) and 1 sidelink slot, or 1 sub-channel and 1 sidelink slot, or other type of resource) in the second sidelink resource pool is separated from a resource (e.g., 1 PRB and 1 sidelink slot, or 1 sub-channel and 1 sidelink slot, or other type of resource) in the first sidelink resource pool. In some examples, the second sidelink resource pool may comprise one or more resources in a sidelink slot, wherein the one or more resources are separated by frequency domain from one or more resources in the first sidelink resource pool (e.g., the one or more resources in the second resource pool may have different frequencies than the one or more resources in the first sidelink pool).

In some examples, the second sidelink resource and the first sidelink resource are in a same carrier/cell. In some examples, the second sidelink resource pool and the first sidelink resource pool are in a same carrier/cell.

In some examples, the new sidelink resource is selected by the first device. In some examples, the first device performs a sidelink resource selection/re-selection procedure for selecting the new sidelink resource. In some examples, the first device operates in device selection mode (e.g., NR sidelink resource allocation mode 2) to acquire the new sidelink resource.

In some examples, the new sidelink resource is in the second sidelink resource pool. In some examples, the new sidelink resource is in the same resource pool as the second sidelink resource. Alternatively and/or additionally, the new sidelink resource may be in a sidelink resource pool different from the second sidelink resource pool. In some examples, the new sidelink resource is not in the first sidelink slot (i.e., the new sidelink resource is not in the overlapped sidelink slot in which the first sidelink resource and the second sidelink resource overlap). When the first device performs sidelink resource selection/re-selection procedure for selecting the new sidelink resource, the first device may exclude candidate sidelink resources in the first sidelink slot (e.g., all candidate sidelink resources in the first sidelink slot) for selecting the new sidelink resource. Alternatively and/or additionally, when the first device performs sidelink resource selection/re-selection procedure for selecting the new sidelink resource, the first device may exclude sidelink resources in the first sidelink slot (e.g., all sidelink resources in the first sidelink slot) from being candidate sidelink resources for selecting the new sidelink resource.

In some examples, the first device may perform a second sidelink transmission on the new sidelink resource. In some examples, the first device may not perform sidelink transmission on the second sidelink resource.

In some examples, there may be some comparisons and/or conditions associated with the first sidelink resource and the second sidelink resource. Embodiments related to such comparisons and/or conditions, as well as operations and/or techniques associated with the embodiments, are described in the following examples. Some and/or all of the comparisons, conditions, techniques and/or embodiments of the following examples can be combined and/or applied concurrently and/or simultaneously.

Example 1

In some examples, the first sidelink resource is acquired in network scheduling mode (e.g., NR sidelink resource allocation mode 1). The second sidelink resource may be acquired in device selection mode (e.g., NR sidelink resource allocation mode 2). In some examples, the first sidelink resource is scheduled and/or indicated (e.g., scheduled for the first device and/or indicated to the first device) via a sidelink grant received from a network node (such as transmitted to the first device). The second sidelink resource may be selected by the first device.

In some examples, if the first sidelink resource is acquired in network scheduling mode (e.g., NR sidelink resource allocation mode 1) and if the second sidelink resource is acquired in device selection mode (e.g., NR sidelink resource allocation mode 2), the first device may perform the resource pre-emption operation on the second sidelink resource and/or on the overlapped sidelink slot). In some examples, both the first sidelink resource and the second sidelink resource are in and/or comprise the overlapped sidelink slot. For example, the first sidelink resource and the second sidelink resource overlap in time domain in slot level (e.g., the overlapped sidelink slot). Where the overlapped sidelink slot has a slot index n, the overlapped sidelink slot can be referred to as slot n. In an example, the first sidelink resource may be in (and/or may comprise and/or cover) slot n and slot n+1 and the second sidelink resource may be in (and/or may comprise and/or cover) slot n (without slot n+1, for example), and thus slot n is the overlapped sidelink slot. Other examples are contemplated where the overlapped sidelink slot (e.g., slot n) is comprised in and/or is covered by both the first sidelink resource and the second sidelink resource. In some examples, if the first sidelink resource is acquired in network scheduling mode (e.g., NR sidelink resource allocation mode 1) and if the second sidelink resource is acquired in device selection mode (e.g., NR sidelink resource allocation mode 2), the first device may ignore, release and/or drop the second sidelink resource (e.g., the first device may ignore, release and/or drop the reservation of the second sidelink resource) and/or may trigger resource re-selection for acquiring a new sidelink resource. In some examples, the first device may prioritize the first sidelink resource acquired in network scheduling mode over the second sidelink resource acquired in device selection mode.

In some examples, if the first sidelink resource is scheduled and/or indicated (e.g., scheduled for the first device and/or indicated to the first device) via a sidelink grant received from a network node (such as transmitted to the first device) and if the second sidelink resource is selected by the first device, the first device may perform the resource pre-emption operation on the second sidelink resource and/or on the overlapped sidelink slot. In some examples, if the first sidelink resource is scheduled and/or indicated (e.g., scheduled for the first device and/or indicated to the first device) via a received sidelink grant from a network node (such as transmitted to the first device) and if the second sidelink resource is selected by the first device, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if the first sidelink resource is not acquired in network scheduling mode (e.g., NR sidelink resource allocation mode 1) or if the first sidelink resource is not scheduled and/or indicated via a sidelink grant received from a network node (such as transmitted to the first device), the first device may not perform resource pre-emption operation, such as operation corresponding to a resource pre-emption mechanism, on the second sidelink resource and/or on the overlapped sidelink slot. In some examples, if the first sidelink resource is not acquired in network scheduling mode or if the first sidelink resource is not scheduled and/or indicated via a received sidelink grant from a network node (such as transmitted to the first device), the first device may not ignore, release and/or drop the second sidelink resource (e.g., the first device may not ignore, release and/or drop the reservation of the second sidelink resource) and/or may not trigger resource re-selection for acquiring a new sidelink resource.

In some examples, if the second sidelink resource is acquired in network scheduling mode (e.g., NR sidelink resource allocation mode 1) or if the second sidelink resource is scheduled and/or indicated (e.g., scheduled for the first device and/or indicated to the first device) via a received sidelink grant from a network node (such as transmitted to the first device), the first device may not perform resource pre-emption operation, such as operation corresponding to a resource pre-emption mechanism, on the second sidelink resource and/or on the overlapped sidelink slot. In some examples, if the second sidelink resource is acquired in network scheduling mode or if the second sidelink resource is scheduled and/or indicated (e.g., scheduled for the first device and/or indicated to the first device) via a sidelink grant received from a network node (such as transmitted to the first device), the first device may not ignore, release and/or drop the second sidelink resource (e.g., the first device may not ignore, release and/or drop the reservation of the second sidelink resource) and/or may not trigger resource re-selection for acquiring a new sidelink resource.

Example 2

In some examples, the second sidelink resource is selected and/or reserved for delivering/transmitting a second data packet associated with a second priority. In some examples, the first sidelink resource may be utilized for delivering/transmitting a first data packet associated with a first priority. In some examples, the first device may receive the first sidelink control information which reserves and/or indicates the first sidelink resource, wherein the first sidelink control information indicates the first priority. In some examples, the first priority is higher than the second priority.

In some examples, if the first priority is higher than the second priority, the first device may perform the resource pre-emption operation on the second sidelink resource and/or on the overlapped sidelink slot). In some examples, if the first priority is higher than the second priority, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if the first priority is lower than the second priority, the first device may not perform resource pre-emption operation, such as operation corresponding to a resource pre-emption mechanism, on the second sidelink resource and/or on the overlapped sidelink slot). In some examples, if the first priority is lower than the second priority, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 3

In some examples, the first device may perform Channel busy ratio (CBR) measurement on the first sidelink resource pool and derive a first CBR metric. In some examples, the first device may perform CBR measurement on the second sidelink resource pool and derive a second CBR metric. In some examples, the first CBR metric is higher than the second CBR metric. In some examples, the first resource pool is busier and/or more congested than the second resource pool.

In some examples, if the first resource pool is busier and/or more congested than the second resource pool, the first device may perform the resource pre-emption operation on the second sidelink resource and/or on the overlapped sidelink slot). In some examples, if the first resource pool is busier and/or more congested than the second resource pool, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if the second resource pool is busier and/or more congested than the first resource pool, the first device may not perform resource pre-emption operation, such as operation corresponding to a resource pre-emption mechanism, on the second sidelink resource and/or on the overlapped sidelink slot. In some examples, if the second resource pool is busier and/or more congested than the first resource pool, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 4

In some examples, the second sidelink resource is selected and/or reserved for delivering a second data packet/transmission with SL HARQ feedback enabled. In some examples, the first sidelink resource may be utilized for delivering/transmitting a first data packet/transmission with SL HARQ feedback disabled. The term "data packet/transmission" as used herein may correspond to a data packet and/or a transmission, such as a transmission of a data packet. In some examples, the first device may receive the first sidelink control information which reserves and/or indicates the first sidelink resource, wherein the first sidelink control information indicates that SL HARQ feedback is disabled.

In some examples, if SL HARQ feedback is enabled for a sidelink transmission (e.g., a possible sidelink transmission) on the second sidelink resource and if SL HARQ feedback is disabled for the first sidelink transmission on the first sidelink resource, the first device may perform the resource pre-emption operation on the second sidelink resource and/or on the overlapped sidelink slot). In some examples, if SL HARQ feedback is enabled for a sidelink transmission (e.g., a possible sidelink transmission) on the second sidelink resource and if SL HARQ feedback is disabled for the first sidelink transmission on the first sidelink resource, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if SL HARQ feedback is disabled for a sidelink transmission (e.g., a possible sidelink transmission) on the second sidelink resource, the first device may not perform resource pre-emption operation, such as operation corresponding to a resource pre-emption mechanism, on the second sidelink resource and/or on the overlapped sidelink slot. In some examples, if SL HARQ feedback is disabled for a sidelink transmission (e.g., a possible sidelink transmission) on the second sidelink resource, the first device may not ignore, release and/or drop the second sidelink resource (e.g., the first device may not ignore, release and/or drop the reservation of the second sidelink resource) and/or may not trigger resource re-selection for acquiring a new sidelink resource.

In some examples, if SL HARQ feedback is enabled for the first sidelink transmission on the first sidelink resource, the first device may not perform resource pre-emption operation, such as operation corresponding to a resource pre-emption mechanism, on the second sidelink resource and/or on the overlapped sidelink slot. In some examples, if SL HARQ feedback is enabled for the first sidelink transmission on the first sidelink resource, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 5

In some examples, the second sidelink resource is selected and/or reserved for delivering a second data packet/transmission with SL HARQ feedback disabled. In some examples, the first sidelink resource may be utilized for delivering/transmitting a first data packet/transmission with SL HARQ feedback enabled. In some examples, the first device may receive the first sidelink control information which reserves and/or indicates the first sidelink resource, wherein the first sidelink control information indicates that SL HARQ feedback is enabled.

In some examples, if SL HARQ feedback is disabled for a sidelink transmission (e.g., a possible sidelink transmission) on the second sidelink resource and if SL HARQ feedback is enabled for the first sidelink transmission on the first sidelink resource, the first device may perform the resource pre-emption operation on the second sidelink resource and/or on the overlapped sidelink slot. In some examples, if SL HARQ feedback is disabled for a sidelink transmission (e.g., a possible sidelink transmission) on the second sidelink resource and if SL HARQ feedback is enabled for the first sidelink transmission on the first sidelink resource, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if SL HARQ feedback is enabled for a sidelink transmission (e.g., a possible sidelink transmission) on the second sidelink resource, the first device may not perform resource pre-emption operation, such as operation corresponding to a resource pre-emption mechanism, on the second sidelink resource and/or on the overlapped sidelink slot. In some examples, if SL HARQ feedback is enabled for a sidelink transmission (e.g., a possible sidelink transmission) on the second sidelink resource, the first device may not ignore, release and/or drop the second sidelink resource (e.g., the first device may not ignore, release and/or drop the reservation of the second sidelink resource) and/or may not trigger resource re-selection for acquiring a new sidelink resource.

In some examples, if SL HARQ feedback is disabled for the first sidelink transmission on the first sidelink resource, the first device may not perform resource pre-emption operation, such as operation corresponding to a resource pre-emption mechanism, on the second sidelink resource and/or on the overlapped sidelink slot. In some examples, if SL HARQ feedback is disabled for the first sidelink transmission on the first sidelink resource, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 6

In some examples, the first sidelink resource is scheduled and/or indicated (e.g., scheduled for the first device and/or indicated to the first device) via a configured sidelink grant from a network node (such as transmitted to the first device). In some examples, the second sidelink resource is scheduled and/or indicated (e.g., scheduled for the first device and/or indicated to the first device) via a dynamic sidelink grant from a network node (such as transmitted to the first device).

In some examples, if the first sidelink resource is scheduled and/or indicated (e.g., scheduled for the first device and/or indicated to the first device) via a configured sidelink grant from a network node (such as transmitted to the first device) and if the second sidelink resource is scheduled and/or indicated (e.g., scheduled for the first device and/or indicated to the first device) via a dynamic sidelink grant from a network node (such as transmitted to the first device), the first device may perform the resource pre-emption operation on the second sidelink resource and/or on the overlapped sidelink slot. In some examples, if the first sidelink resource is scheduled and/or indicated (e.g., scheduled for the first device and/or indicated to the first device) via a configured sidelink grant from a network node (such as transmitted to the first device) and if the second sidelink resource is scheduled and/or indicated (e.g., scheduled for the first device and/or indicated to the first device) via a dynamic sidelink grant from a network node (such as transmitted to the first device), the first device may ignore, release and/or drop the second sidelink resource (e.g., the first device may ignore, release and/or drop the reservation of the second sidelink resource).

In some examples, if the first sidelink resource is scheduled and/or indicated (e.g., scheduled for the first device and/or indicated to the first device) via a dynamic sidelink grant from a network node (such as transmitted to the first device), the first device may not perform resource pre-emption operation, such as operation corresponding to a resource pre-emption mechanism, on the second sidelink resource and/or on the overlapped sidelink slot. In some examples, if the first sidelink resource is scheduled and/or indicated (e.g., scheduled for the first device and/or indicated to the first device) via a dynamic sidelink grant from a network node (such as transmitted to the first device), the first device may not ignore, release and/or drop the second sidelink resource (e.g., the first device may not ignore, release and/or drop the reservation of the second sidelink resource).

In some examples, if the second sidelink resource is scheduled and/or indicated (e.g., scheduled for the first device and/or indicated to the first device) via a configured sidelink grant from a network node (such as transmitted to the first device), the first device may not perform resource pre-emption operation, such as operation corresponding to a resource pre-emption mechanism, on the second sidelink resource and/or on the overlapped sidelink slot). In some examples, if the second sidelink resource is scheduled and/or indicated (e.g., scheduled for the first device and/or indicated to the first device) via a configured sidelink grant from a network node (such as transmitted to the first device), the first device may not ignore, release and/or drop the second sidelink resource (e.g., the first device may not ignore, release and/or drop the reservation of the second sidelink resource).

Example 7

In some examples, the first sidelink resource is scheduled and/or indicated (e.g., scheduled for the first device and/or indicated to the first device) via a dynamic sidelink grant from a network node (such as transmitted to the first device). In some examples, the second sidelink resource is scheduled and/or indicated (e.g., scheduled for the first device and/or indicated to the first device) via a configured sidelink grant from a network node (such as transmitted to the first device)

In some examples, if the first sidelink resource is scheduled and/or indicated (e.g., scheduled for the first device and/or indicated to the first device) via a dynamic sidelink grant from a network node (such as transmitted to the first device) and if the second sidelink resource is scheduled and/or indicated (e.g., scheduled for the first device and/or indicated to the first device) via a configured sidelink grant from a network node (such as transmitted to the first device), the first device may perform the resource pre-emption operation on the second sidelink resource and/or on the overlapped sidelink slot. In some examples, if the first sidelink resource is scheduled and/or indicated (e.g., scheduled for the first device and/or indicated to the first device) via a dynamic sidelink grant from a network node (such as transmitted to the first device) and if the second sidelink resource is scheduled and/or indicated (e.g., scheduled for the first device and/or indicated to the first device) via a configured sidelink grant from a network node (such as transmitted to the first device), the first device may ignore, release and/or drop the second sidelink resource (e.g., the first device may ignore, release and/or drop the reservation of the second sidelink resource).

In some examples, if the first sidelink resource is scheduled and/or indicated (e.g., scheduled for the first device and/or indicated to the first device) via a configured sidelink grant from a network node (such as transmitted to the first device), the first device may not perform resource pre-emption operation, such as operation corresponding to a resource pre-emption mechanism, on the second sidelink resource. In some examples, if the first sidelink resource is scheduled and/or indicated (e.g., scheduled for the first device and/or indicated to the first device) via a configured sidelink grant from a network node (such as transmitted to the first device), the first device may not ignore, release and/or drop the second sidelink resource (e.g., the first device may not ignore, release and/or drop the reservation of the second sidelink resource).

In some examples, if the second sidelink resource is scheduled and/or indicated (e.g., scheduled for the first device and/or indicated to the first device) via a dynamic sidelink grant from a network node (such as transmitted to the first device), the first device may not perform resource pre-emption operation, such as operation corresponding to a resource pre-emption mechanism, on the second sidelink resource. In some examples, if the second sidelink resource is scheduled and/or indicated (e.g., scheduled for the first device and/or indicated to the first device) via a dynamic sidelink grant from a network node (such as transmitted to the first device), the first device may not ignore, release and/or drop the second sidelink resource (e.g., the first device may not ignore, release and/or drop the reservation of the second sidelink resource).

Example 8

In some examples, the second sidelink resource is selected and/or reserved for delivering a second data packet/transmission associated with a second cast-type. In some examples, the first sidelink resource may be utilized for delivering/transmitting a first data packet/transmission associated with a first cast-type. In some examples, the first device may receive the first sidelink control information which reserves and/or indicates the first sidelink resource, wherein the first sidelink control information indicates a third sidelink transmission associated with the first cast-type. In some examples, the first cast-type may be any one of broadcast, groupcast, or unicast. In some examples, the second cast-type may be any one of broadcast, groupcast, or unicast. In some examples, the first cast-type may be different from the second cast-type. Alternatively and/or additionally, the first cast-type may be the same as the second cast-type.

In some examples, if the first cast-type and the second cast-type are a first cast-type combination, the first device may perform the resource pre-emption operation on the second sidelink resource and/or on the overlapped sidelink slot. In some examples, if the first cast-type and the second cast-type are the first cast-type combination, the first device may ignore, release and/or drop the second sidelink resource (e.g., the first device may ignore, release and/or drop the reservation of the second sidelink resource) and/or may trigger resource re-selection for acquiring a new sidelink resource.

In some examples, if the first cast-type and the second cast-type are not the first cast-type combination, the first device may not perform resource pre-emption operation, such as operation corresponding to a resource pre-emption mechanism, on the second sidelink resource and/or on the overlapped sidelink slot). In some examples, if the first cast-type and the second cast-type are not the first cast-type combination, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 9

In some examples, if the first device does not signal the reservation of the second sidelink resource before the first device receives the sidelink grant for scheduling and/or indicating the first sidelink resource or before the first device receives the first sidelink control information for reserving and/or indicating the first sidelink resource, the first device may perform the resource pre-emption operation on the second sidelink resource and/or on the overlapped sidelink slot. In some examples, if the first device does not transmit a third sidelink control information, which reserves and/or indicates the second sidelink resource, before the first device receives the sidelink grant for scheduling and/or indicating the first sidelink resource or before the first device receives the first sidelink control information for reserving and/or indicating the first sidelink resource, the first device may ignore, release and/or drop the second sidelink resource (e.g., the first device may ignore, release and/or drop the reservation of the second sidelink resource) and/or may trigger resource re-selection for acquiring a new sidelink resource.

Alternatively and/or additionally, if the first device has signaled the reservation of the second sidelink resource before the first device receives the sidelink grant for scheduling and/or indicating the first sidelink resource or before the first device receives the first sidelink control information for reserving and/or indicating the first sidelink resource, the first device may not perform resource pre-emption operation, such as operation corresponding to a resource pre-emption mechanism, on the second sidelink resource and/or on the overlapped sidelink slot. In some examples, if the first device has transmitted a third sidelink control information, which reserves and/or indicates the second sidelink resource, before the first device receives the sidelink grant for scheduling and/or indicating the first sidelink resource or before the first device receives the first sidelink control information for reserving and/or indicating the first sidelink resource, the first device may not ignore, release and/or drop the second sidelink resource (e.g., the first device may not ignore, release and/or drop the reservation of the second sidelink resource) and/or may not trigger resource re-selection for acquiring a new sidelink resource.

Example 10

In some examples, before the first device receives the sidelink grant for scheduling and/or indicating the first sidelink resource, the first device may have, achieve and/or arrange an allowed number of reserved/scheduled sidelink transmissions (such as in the overlapped sidelink slot) (e.g., before reception of the sidelink grant, one or more sidelink transmissions, a number of which meets the allowed number of reserved/scheduled sidelink transmissions, may have already been reserved and/or scheduled for performance by the first device). In some examples, when the first device receives the sidelink grant for scheduling and/or indicating the first sidelink resource, the reserved/scheduled sidelink transmissions (in a carrier/cell) may exceed the allowed number of reserved/scheduled sidelink transmissions (such as due to scheduling the first sidelink transmission on the first sidelink resource). In some examples, if the allowed number of reserved/scheduled sidelink transmissions is exceeded (such as where sidelink transmissions, a number of which exceeds the allowed number of reserved/scheduled sidelink transmissions, are reserved and/or scheduled for performance by the first device in the overlapped sidelink slot), the first device may perform the resource pre-emption operation on the second sidelink resource and/or on the overlapped sidelink slot. In some examples, if the allowed number of reserved/scheduled sidelink transmissions is exceeded, the first device may ignore, release and/or drop the second sidelink resource (e.g., the first device may ignore, release and/or drop the reservation of the second sidelink resource) and/or may trigger resource re-selection for acquiring a new sidelink resource.

In some examples, when the first device receives the sidelink grant for scheduling and/or indicating the first sidelink resource and when reserved/scheduled sidelink transmissions (in a carrier/cell and/or in the overlapped sidelink slot) do not exceed the allowed number of the first device, the first device may not perform resource pre-emption operation, such as operation corresponding to a resource pre-emption mechanism, on the second sidelink resource and/or on the overlapped sidelink slot. In some examples, when the first device receives the sidelink grant for scheduling and/or indicating the first sidelink resource and when the reserved/scheduled sidelink transmissions (in a carrier/cell) do not exceed the allowed number of the first device, the first device may not ignore, release and/or drop the second sidelink resource (e.g., the first device may not ignore, release and/or drop the reservation of the second sidelink resource) and/or may not trigger resource re-selection for acquiring a new sidelink resource. In some examples, when the first device receives the sidelink grant for scheduling and/or indicating the first sidelink resource and when the reserved/scheduled sidelink transmissions (in a carrier/cell) do not exceed the allowed number of the first device, if a total transmit power in a slot (e.g., the overlapped sidelink slot) exceeds the maximum allowed transmit power (e.g., PCMAX), the first device may transmit a sidelink transmission that delivers a data packet with a highest relative priority or a priority relatively higher than one or more other priorities of one or more other data packets associated with the slot (e.g., the transmission of the sidelink transmission may be performed without power scaling). The first device may drop the sidelink transmission delivering a data packet with a lowest relative priority or a priority relatively lower than one or more other priorities of one or more other data packets associated with the slot. Alternatively and/or additionally, the first device may perform power scaling (e.g., reduce transmit power) on the sidelink transmission for delivering/transmitting a data packet with a lowest relative priority or a priority relatively lower than one or more other priorities of one or more other data packets associated with the slot.

One, some and/or all of the foregoing techniques and/or embodiments can be formed to a new embodiment.

In some examples, embodiments disclosed herein, such as embodiments described with respect to Example Embodiment 1 and Example Embodiment 2, may be implemented independently and/or separately. Alternatively and/or additionally, a combination of embodiments described herein, such as embodiments described with respect to Example Embodiment 1 and/or Example Embodiment 2, may be implemented. Alternatively and/or additionally, a combination of embodiments described herein, such as embodiments described with respect to Example Embodiment 1 and/or Example Embodiment 2, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

FIG. 5 illustrates a table 500 associated with exemplary scenarios where different resource allocation modes are used for acquiring sidelink resources, according to some embodiments. In an example scenario 1 of the table 500, the second sidelink resource, such as the second sidelink resource discussed with respect to the Example Embodiment 1 and Example Embodiment 2, may be acquired in mode 1 (e.g., network scheduling mode, such as NR sidelink resource allocation mode 1), and the first sidelink resource, such as the first sidelink resource discussed with respect to the Example Embodiment 1 and Example Embodiment 2, may be acquired in mode 2 (e.g., device selection mode, such as NR sidelink resource allocation mode 2). In each scenario of the table 500, both the first sidelink resource and the second sidelink resource are acquired for performing a sidelink transmission (TX). In the example scenario 1, if the first sidelink resource overlaps with the second sidelink resource, the first device may apply Example Embodiment 1 (e.g., the first device may perform one or more operations corresponding to Example Embodiment 1, such as to handle resource overlap and/or avoid transmission overlap). In example scenario 2 of the table 500, the second sidelink resource may be acquired in mode 2 and the first sidelink resource may be acquired in mode 1. In the example scenario 2, if the first sidelink resource overlaps with the second sidelink resource, the first device may apply Example Embodiment 2 (e.g., the first device may perform one or more operations corresponding to Example Embodiment 2, such as to handle resource overlap and/or avoid transmission overlap). In example scenario 3 of the table 500, the second sidelink resource may be acquired in mode 2 and the first sidelink resource may be acquired in mode 2. In the example scenario 3, if the first sidelink resource overlaps with the second sidelink resource, the first device may apply Example Embodiment 1 and/or Example Embodiment 2 (e.g., the first device may perform one or more operations corresponding to Example Embodiment 1 and/or Example Embodiment 2, such as to handle resource overlap and/or avoid transmission overlap). Example scenario 4 of the table 500, where the second sidelink resource is acquired in mode 1 and the first sidelink resource is acquired in mode 1, may not occur.

FIG. 6 illustrates a table 600 associated with various exemplary scenarios, according to some embodiments. In an example scenario 1 of the table 600, the second sidelink resource is acquired in mode 1 (e.g., network scheduling mode, such as NR sidelink resource allocation mode 1) for performing (e.g., transmitting) a second sidelink transmission (TX). In the example scenario 1 of the table 600, the first sidelink resource may be reserved (and/or indicated to the first device) for receiving a first sidelink transmission (RX). In the example scenario 1 of the table 600, if the first sidelink resource overlaps with the second sidelink resource, the first device may perform the second sidelink transmission (e.g., transmit the second sidelink transmission) using the second sidelink resource or receive the first sidelink transmission using the first sidelink resource.

In an example scenario 2 of the table 600, the second sidelink resource is acquired in mode 2 (e.g., device selection mode, such as NR sidelink resource allocation mode 2) for performing (e.g., transmitting) a second sidelink transmission (TX). In the example scenario 2 of the table 600, the first sidelink resource may be reserved (and/or indicated to the first device) for receiving a first sidelink transmission (RX). In the example scenario 2 of the table 600, if the first sidelink resource overlaps with the second sidelink resource, the first device may perform the second sidelink transmission (e.g., transmit the second sidelink transmission) using the second sidelink resource or the first device may receive the first sidelink transmission using the first sidelink resource and apply Example Embodiment 2 (e.g., the first device may receive the first sidelink transmission using the first sidelink resource and perform one or more operations corresponding to Example Embodiment 2, such as to handle resource overlap).

In an example scenario 3 of the table 600, the second sidelink resource may be reserved (and/or indicated to the first device) for receiving a second sidelink transmission (RX). In the example scenario 3 of the table 600, the first sidelink resource is acquired in mode 1 (e.g., network scheduling mode) for performing (e.g., transmitting) a first sidelink transmission (TX). In the example scenario 3 of the table 600, if the first sidelink resource overlaps with the second sidelink resource, the first device may perform the first sidelink transmission (e.g., transmit the first sidelink transmission) using the first sidelink resource or receive the second sidelink transmission using the second sidelink resource.

In an example scenario 4 of the table 600, the second sidelink resource may be reserved (and/or indicated to the first device) for receiving a second sidelink transmission (RX). In the example scenario 4 of the table 600, the first sidelink resource is acquired in mode 2 for performing (e.g., transmitting) a first sidelink transmission (TX). In the example scenario 4 of the table 600, if the first sidelink resource overlaps with the second sidelink resource, the first device may perform the first sidelink transmission (e.g., transmit the first sidelink transmission) using the first sidelink resource or the first device may receive the second sidelink transmission using the second sidelink resource and apply Example Embodiment 2 (e.g., the first device may receive the second sidelink transmission using the second sidelink resource and perform one or more operations corresponding to Example Embodiment 2, such as to handle resource overlap).

With respect to one or more embodiments herein, such as one or more embodiments of Example Embodiment 1 and/or one or more embodiments of Example Embodiment 2, in some examples, the sidelink grant may be a dynamic sidelink grant. In some examples, the sidelink grant may be a downlink control information transmitted from a network node, wherein the downlink control information indicates and/or schedules one or more sidelink resources for the first device.

With respect to one or more embodiments herein, in some examples, the sidelink grant may be a configured sidelink grant. In some examples, the sidelink grant may be a type-1 configured sidelink grant (e.g., a sidelink grant with activation without downlink control information). In some examples, the sidelink grant may be a type-2 configured sidelink grant (e.g., a sidelink grant which requires downlink control information for activation). In some examples, the sidelink grant may be a downlink control information transmitted from a network node, wherein the downlink control information is used to activate a sidelink Semi-Persistent Scheduling (SL SPS) (e.g., a SL SPS configuration) for the first device (e.g., the SL SPS may be activated responsive to and/or based upon the downlink control information).

With respect to one or more embodiments herein, in some examples, the sidelink grant may be a scheduling sidelink control information transmitted from a device (e.g., a specific device) within a sidelink group, wherein the scheduling sidelink control information indicates and/or schedules one or more sidelink resources for the first device. In some examples, the first device utilizes the one or more sidelink resources for performing (e.g., transmitting) one or more sidelink transmissions to one or more devices within the sidelink group.

With respect to one or more embodiments herein, in some examples, the first device may be capable of performing (e.g., transmitting) at most one sidelink transmission in a sidelink slot in a carrier/cell. In some examples, the allowed number of the first device (e.g., the allowed number of reserved/scheduled sidelink transmissions) is one.

Alternatively and/or additionally, the first device may be capable of performing (e.g., transmitting) multiple sidelink transmissions (e.g., simultaneously and/or concurrently) in a sidelink slot in a carrier/cell. The multiple sidelink transmissions in the sidelink slot in the carrier/cell may limited and/or restricted by the allowed number. For example, the allowed number may be a maximum number of the multiple sidelink transmissions in the sidelink slot in the carrier/cell. In some examples, the multiple sidelink transmissions are associated with multiple data packets. For example, each sidelink transmission of the multiple sidelink transmissions may be associated with a data packet of the multiple data packets (e.g., a sidelink transmission of the multiple sidelink transmissions may be performed to deliver a data packet, of the multiple data packets, to one or more devices). The multiple data packets may be associated with multiple priorities (e.g., each data packet of the multiple data packets may be associated with a priority of the multiple priorities). In some examples, when the number of the multiple sidelink transmissions in the sidelink slot in the carrier/cell does not exceed the allowed number, and if a total transmit power of the multiple sidelink transmissions in the sidelink slot exceeds a maximum allowed transmit power (e.g., PCMAX), the first device may transmit one or more first sidelink transmissions, of the multiple sidelink transmissions, based upon the multiple priorities associated with the multiple data packets. For example, the one or more first sidelink transmissions may be performed based upon the one or more first sidelink transmissions delivering one or more first data packets associated with one or more higher and/or highest relative priorities of the multiple priorities. The one or more first sidelink transmissions may be performed without power scaling. The first device may drop one or more second sidelink transmissions, of the multiple sidelink transmissions, associated with one or more second data packets associated with one or more lower and/or lowest relative priorities of the multiple priorities. The one or more second sidelink transmissions may be dropped based upon the multiple priorities of the multiple data packets, such as based upon one or more first priorities of the one or more first data packets being higher than (e.g., relatively higher than) one or more second priorities of the one or more second data packets. Alternatively and/or additionally, the first device may perform power scaling (e.g., reduce transmit power) on the one or more second sidelink transmissions. The first device may perform power scaling on the one or more second sidelink transmissions based upon the multiple priorities of the multiple data packets, such as based upon the one or more first priorities of the one or more first data packets being higher than (e.g., relatively higher than) the one or more second priorities of the one or more second data packets.

With respect to one or more embodiments herein, in some examples, the first device may have, maintain and/or establish multiple sidelink links/connections on PC5 interface. For different sidelink links/connections, the first device may perform (e.g., transmit) and/or receive sidelink transmissions to and/or from one or more different paired devices.

With respect to one or more embodiments herein, in some examples, the first device may have, maintain and/or establish a first sidelink link/connection and a second sidelink link/connection. A first paired device of the first sidelink link/connection may be different from a second paired device of the second sidelink link/connection. In some examples, one or more sidelink logical channels, associated with the first paired device and/or the first sidelink link/connection, are separate from and/or independent of one or more sidelink logical channels, associated with the second paired device and/or the second sidelink link/connection.

With respect to one or more embodiments herein, in some examples, the first sidelink resource may be utilized for sidelink transmission, sidelink reception and/or sidelink communication of the first sidelink link/connection. In some examples, the first sidelink link/connection may be a unicast link/connection. In some examples, the first sidelink link/connection may be a groupcast link/connection. In some examples, the first sidelink link/connection may be a broadcast link/connection. In some examples, the first device may perform sidelink transmission, sidelink reception and/or sidelink communication of the first sidelink link/connection in the first sidelink resource pool. In some examples, the first sidelink link/connection is associated with a first resource allocation mode. In some examples, the first device may perform sidelink transmission, sidelink reception and/or sidelink communication of the first sidelink link/connection in association with the first resource allocation mode.

With respect to one or more embodiments herein, in some examples, the second sidelink resource may be utilized for sidelink transmission, sidelink reception and/or sidelink communication of the second sidelink link/connection. In some examples, the second sidelink link/connection may be a unicast link/connection. In some examples, the second sidelink link/connection may be a groupcast link/connection. In some examples, the second sidelink link/connection may be a broadcast link/connection. In some examples, the first device may perform sidelink transmission, sidelink reception and/or sidelink communication of the second sidelink link/connection in the second sidelink resource pool. In some examples, the second sidelink link/connection is associated with a second resource allocation mode. In some examples, the first device may perform sidelink transmission, sidelink reception and/or sidelink communication of the second sidelink link/connection in association with the second resource allocation mode. In some examples, the second sidelink resource pool and the first sidelink resource pool are at least frequency-division multiplexing (FDM) in a same carrier/cell. In some examples, frequency resources of the second sidelink resource pool are different and/or separate from frequency resources of the first sidelink resource pool.

With respect to one or more embodiments herein, in some examples, the network node may be a gNB. In some examples, the network node may be a base station. In some examples, the network node may be a roadside unit (RSU). In some examples, the network node may be a network-type RSU. In some examples, the network node may be a UE-type RSU. In some examples, the network node may be replaced and/or represented by a device (e.g., a specific device) within a sidelink group.

With respect to one or more embodiments herein, in some examples, the data packet (e.g., the first data packet associated with the first sidelink resource and/or the second data packet associated with the second sidelink resource) is associated with one or more sidelink logical channels. In some examples, sidelink data of the data packet comes from one or more sidelink logical channels. In some examples, the first data packet may be associated with one or more first sidelink logical channels. The second data packet may be associated with one or more second sidelink logical channels. The one or more first sidelink logical channels may be separate from and/or independent of the one or more second sidelink logical channels.

With respect to one or more embodiments herein, in some examples, the sidelink transmission (e.g., the first sidelink transmission and/or the second sidelink transmission) may be a PSSCH transmission.

With respect to one or more embodiments herein, in some examples, the sidelink control information may be delivered in PSCCH. In some examples, the sidelink control information may comprise 1st stage sidelink control information. In some examples, the sidelink control information may comprise 2nd stage sidelink control information.

With respect to one or more embodiments herein, in some examples, the term "sidelink slot" may correspond to a slot for sidelink. In some examples, a sidelink slot may be represented as a Transmission Time Interval (TTI). In some examples, a TTI may be a subframe (e.g., a subframe for sidelink). In some examples, a TTI comprises multiple symbols, e.g., 12 or 14 symbols. In some examples, the TTI may be a slot comprising sidelink symbols (e.g., a slot fully and/or partially comprising sidelink symbols). In some examples, the TTI may be a transmission time interval for a sidelink transmission (e.g., a transmission of sidelink data). In some examples, a sidelink slot (e.g., a slot for sidelink) may comprise OFDM symbols (e.g., all OFDM symbols) available for sidelink transmission. In some examples, a sidelink slot (e.g., a slot for sidelink) may comprise a consecutive number of symbols available for sidelink transmission. In some examples, a sidelink slot (e.g., a slot for sidelink), as discussed herein, may be a slot that is included in a sidelink resource pool. In some examples, a symbol, as discussed herein, may be a symbol that is indicated and/or configured for sidelink.

With respect to one or more embodiments herein, in some examples, a sub-channel is a unit for sidelink resource allocation and/or scheduling (such as for PSSCH). In some examples, a sub-channel may comprise multiple contiguous PRBs in frequency domain. In some examples, a number of PRBs for each sub-channel may be configured (e.g., pre-configured) for a sidelink resource pool. In some examples, a sidelink resource pool configuration (e.g., pre-configuration) may indicate and/or configure the number of PRBs for each sub-channel. In some examples, the number of PRBs for each sub-channel may be 4, 5, 6, 8, 9, 10, 12, 15, 16, 18, 20, 25, 30, 48, 50, 72, 75, 96, or 100 (or a different value). In some examples, a sub-channel may be represented as a unit for sidelink resource allocation and/or scheduling. In some examples, a sub-channel may be a PRB. In some examples, a sub-channel may be a set of consecutive PRBs in frequency domain. In some examples, a sub-channel may be a set of consecutive resource elements in frequency domain.

With respect to one or more embodiments herein, in some examples, the SL HARQ feedback may comprise ACK or NACK. In some examples, the SL HARQ feedback for a data packet may be derived (and/or generated) based upon whether or not a receiving device successfully receives and/or decodes a data packet delivered in an associated sidelink transmission (and/or an associated sidelink retransmission).

With respect to one or more embodiments herein, in some examples, a data packet may be a Transport Block (TB). In some examples, a data packet may be a Medium Access Control Protocol Data Unit (MAC PDU). In some examples, a data packet may be one or more TBs (e.g., one TB or two TBs) delivered (and/or included) in one sidelink transmission (and/or one sidelink retransmission).

With respect to one or more embodiments herein, in some examples, the sidelink transmission and/or reception (e.g., transmission and/or reception of the first sidelink transmission and/or the second sidelink transmission) may be device-to-device transmission and/or reception. In some examples, the sidelink transmission and/or reception may be V2X transmission and/or reception. In some examples, the sidelink transmission and/or reception may be P2X transmission and/or reception. In some examples, the sidelink transmission and/or reception may be on PC5 interface.

With respect to one or more embodiments herein, in some examples, the PC5 interface may be a wireless interface for communication between a device and a device. In some examples, the PC5 interface may be a wireless interface for communication between devices. In some examples, the PC5 interface may be a wireless interface for communication between UEs. In some examples, the PC5 interface may be a wireless interface for V2X communication and/or P2X communication. In some examples, the Uu interface may be a wireless interface for communication between a network node and a device. In some examples, the Uu interface may be a wireless interface for communication between a network node and a UE.

With respect to one or more embodiments herein, in some examples, the first device and the second device are different devices.

With respect to one or more embodiments herein, in some examples, the first device may be a UE. In some examples, the first device may be a vehicle UE. In some examples, the first device may be a V2X UE. In some examples, the second device may be a UE. In some examples, the second device may be a vehicle UE. In some examples, the second device may be a V2X UE.

Figure 7:
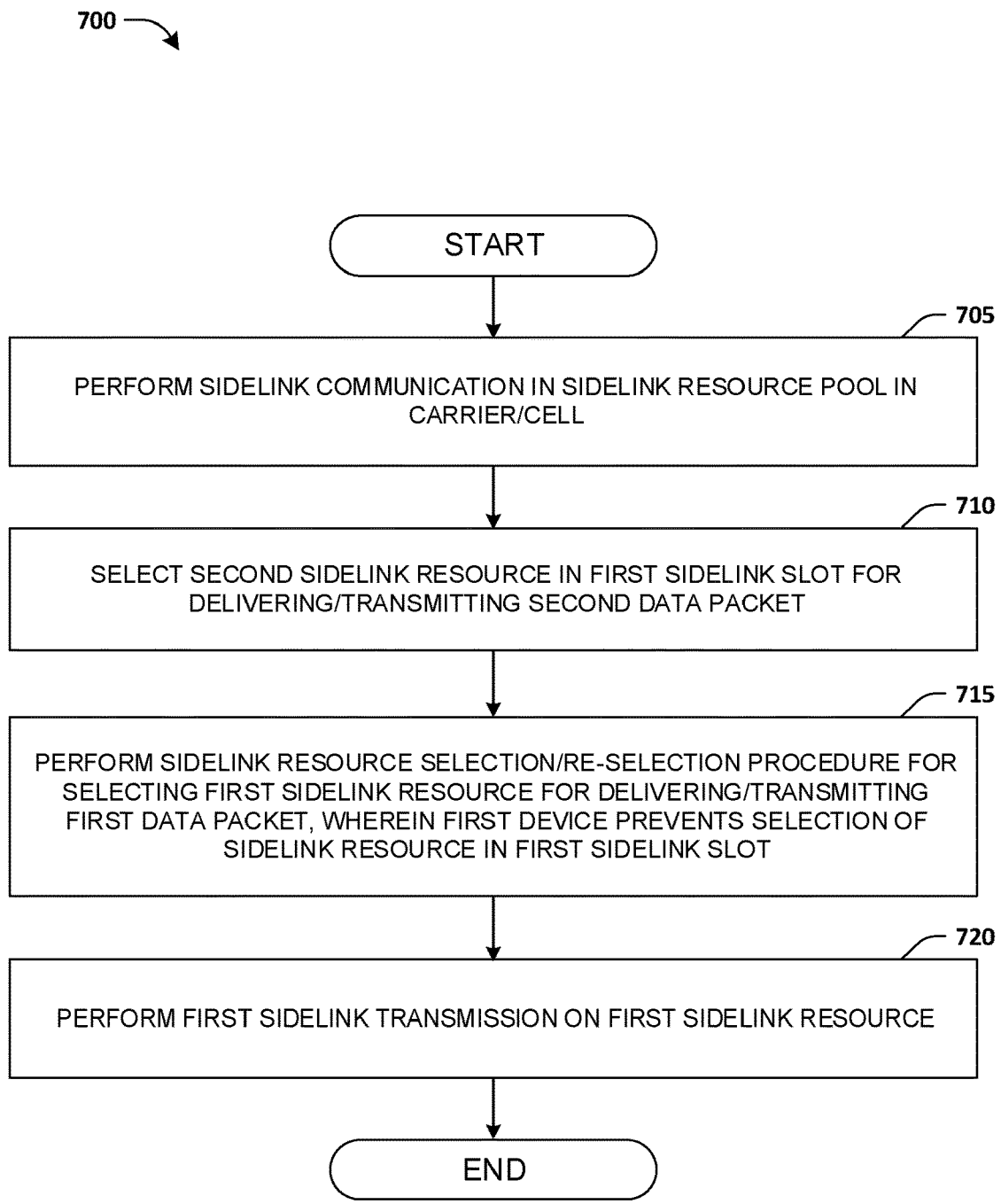
FIG. 7 is a flow chart according to one exemplary embodiment.

FIG. 7 is a flow chart 700 according to one exemplary embodiment for performing sidelink communication from the perspective of a first device. In step 705, the first device performs sidelink communication in a sidelink resource pool in a carrier/cell. In step 710, the first device selects a second sidelink resource in a first sidelink slot for delivering/transmitting a second data packet. In step 715, the first device performs a sidelink resource selection/re-selection procedure for selecting a first sidelink resource for delivering/transmitting a first data packet, wherein the first device prevents selection of a sidelink resource in the first sidelink slot (e.g., the first device prevents selection of any sidelink resource in the first sidelink slot) as the first sidelink resource. For example, the first device selects a sidelink resource, that is not in the first sidelink slot, as the first sidelink resource. In step 720, the first device performs a first sidelink transmission on the first sidelink resource.

In one embodiment, when the first device performs the sidelink resource selection/re-selection procedure for selecting the first sidelink resource, the first device excludes candidate sidelink resources in the first sidelink slot (e.g., all candidate sidelink resources in the first sidelink slot). The candidate sidelink resources in the first sidelink slot may be excluded from consideration in the sidelink resource selection/re-selection procedure.

In one embodiment, the first device performs the sidelink resource selection/re-selection procedure for selecting the first sidelink resource after the first device selects the second sidelink resource.

In one embodiment, a first priority of the first data packet is lower than (e.g., relatively lower than) a second priority of the second data packet.

In one embodiment, the second sidelink resource is selected by the first device.

In one embodiment, the first device performs a second sidelink resource selection/re-selection procedure for selecting the second sidelink resource, wherein the second sidelink resource is within a resource selection window associated with the second sidelink resource selection/re-selection procedure.

Referring back to FIGS. 3 and 4, in one exemplary embodiment of a first device, the device 300 includes a program code 312 stored in the memory 310. The CPU 308 could execute program code 312 to enable the first device (i) to perform sidelink communication in a sidelink resource pool in a carrier/cell, (ii) to select a second sidelink resource in a first sidelink slot for delivering/transmitting a second data packet, (iii) to perform a sidelink resource selection/re-selection procedure for selecting a first sidelink resource for delivering/transmitting a first data packet, wherein the first device prevents selection of a sidelink resource in the first sidelink slot (e.g., the first device prevents selection of any sidelink resource in the first sidelink slot) as the first sidelink resource, and (iv) to perform a first sidelink transmission on the first sidelink resource. Furthermore, the CPU 308 can execute the program code 312 to perform one, some and/or all of the above-described actions and steps and/or others described herein.

Figure 8:
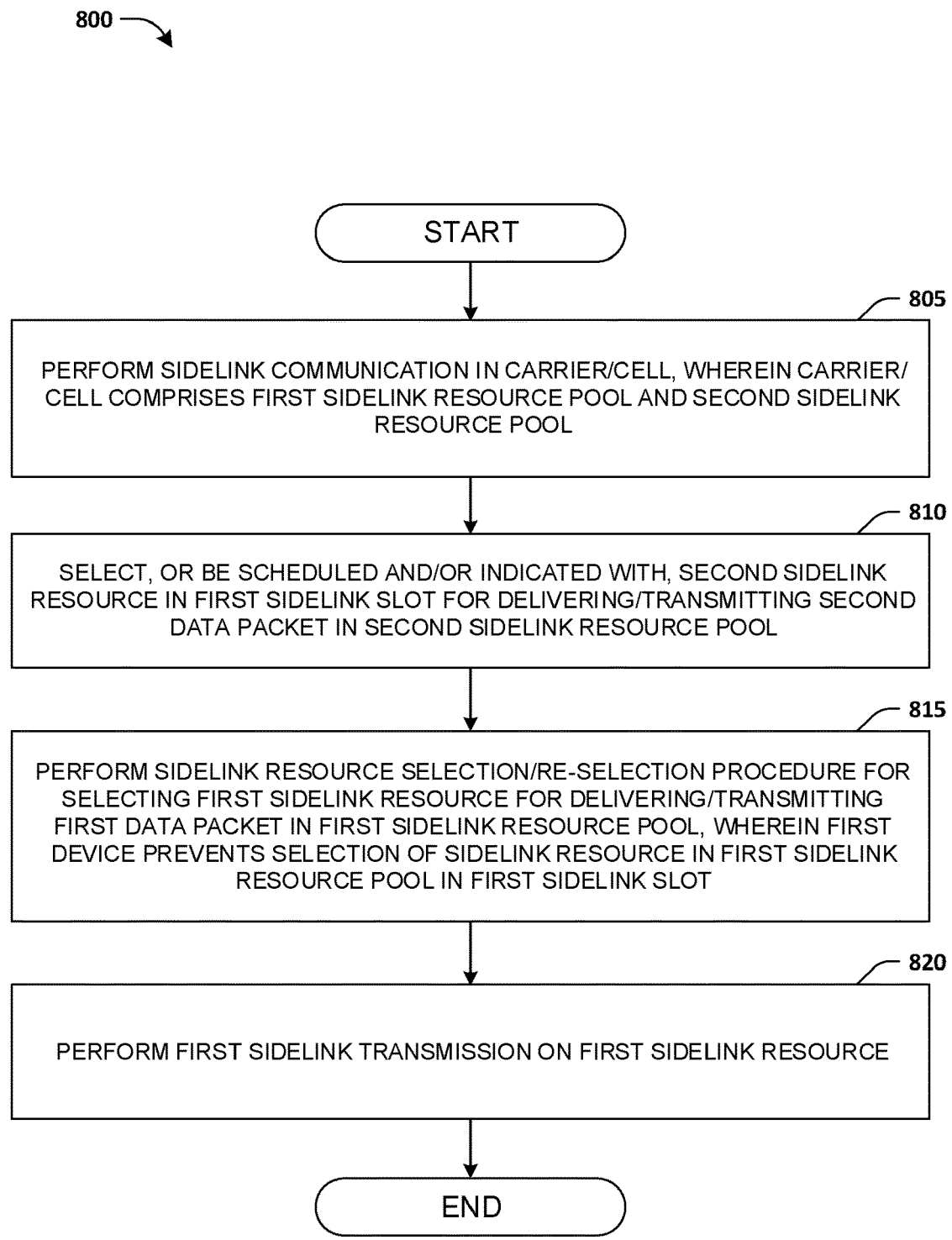
FIG. 8 is a flow chart according to one exemplary embodiment.

FIG. 8 is a flow chart 800 according to one exemplary embodiment for performing sidelink communication from the perspective of a first device. In step 805, the first device performs sidelink communication in a carrier/cell, wherein the carrier/cell comprises a first sidelink resource pool and a second sidelink resource pool. In step 810, the first device selects, or is scheduled and/or indicated with, a second sidelink resource in a first sidelink slot for delivering/transmitting a second data packet in the second sidelink resource pool. In step 815, the first device performs a sidelink resource selection/re-selection procedure for selecting a first sidelink resource for delivering/transmitting a first data packet in the first sidelink resource pool, wherein the first device prevents selection of a sidelink resource in the first sidelink resource pool in the first sidelink slot (e.g., the first device prevents selection of any sidelink resource in the first sidelink resource pool in the first sidelink slot) as the first sidelink resource. For example, the first device selects a sidelink resource, that is not in the first sidelink slot, as the first sidelink resource. In step 820, the first device performs a first sidelink transmission on the first sidelink resource.

In one embodiment, when the first device performs the sidelink resource selection/re-selection procedure for selecting the first sidelink resource, the first device excludes candidate sidelink resources in the first sidelink resource pool in the first sidelink slot (e.g., all candidate sidelink resources in the first sidelink resource pool in the first sidelink slot). The candidate sidelink resources in the first sidelink resource pool in the first sidelink slot may be excluded from consideration in the sidelink resource selection/re-selection procedure.

In one embodiment, the first device performs the sidelink resource selection/re-selection procedure for selecting the first sidelink resource after the first device selects, or is scheduled and/or indicated with, the second sidelink resource.

In one embodiment, a first priority of the first data packet is lower than (e.g., relatively lower than) a second priority of the second data packet.

In one embodiment, the second sidelink resource is selected by the first device.

In one embodiment, the first device performs a second sidelink resource selection/re-selection procedure for selecting the second sidelink resource, wherein the second sidelink resource is within a resource selection window associated with the second sidelink resource selection/re-selection procedure.

In one embodiment, the second sidelink resource is scheduled and/or indicated by a sidelink grant received from a network node.

In one embodiment, the second sidelink resource is scheduled and/or indicated by a sidelink grant received from a second node.

In one embodiment, the first device receives a sidelink control information which reserves and/or indicates the second sidelink resource.

Referring back to FIGS. 3 and 4, in one exemplary embodiment of a first device, the device 300 includes a program code 312 stored in the memory 310. The CPU 308 could execute program code 312 to enable the first device (i) to perform sidelink communication in a carrier/cell, wherein the carrier/cell comprises a first sidelink resource pool and a second sidelink resource pool, (ii) to select, or be scheduled and/or indicated with, a second sidelink resource in a first sidelink slot for delivering/transmitting a second data packet in the second sidelink resource pool, (iii) to perform a sidelink resource selection/re-selection procedure for selecting a first sidelink resource for delivering/transmitting a first data packet in the first sidelink resource pool, wherein the first device prevents selection of a sidelink resource in the first sidelink resource pool in the first sidelink slot (e.g., the first device prevents selection of any sidelink resource in the first sidelink resource pool in the first sidelink slot) as the first sidelink resource, and (iv) to perform a first sidelink transmission on the first sidelink resource. Furthermore, the CPU 308 can execute the program code 312 to perform one, some and/or all of the above-described actions and steps and/or others described herein.

Figure 9:
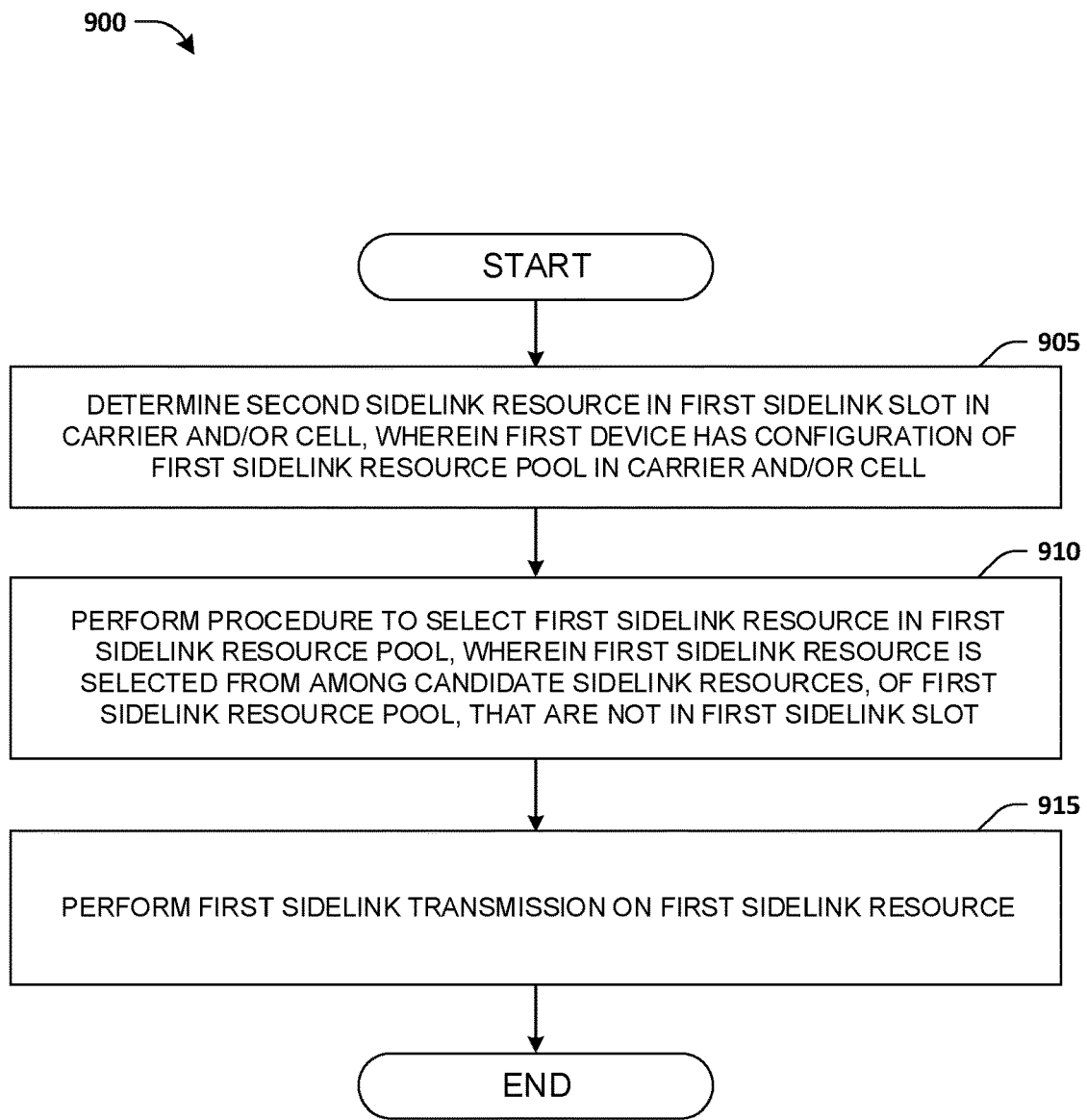
FIG. 9 is a flow chart according to one exemplary embodiment.

FIG. 9 is a flow chart 900 according to one exemplary embodiment from the perspective of a first device. In step 905, the first device determines a second sidelink resource in a first sidelink slot in a carrier/cell, wherein the first device has a configuration of a first sidelink resource pool in the carrier/cell. For example, the first device may select the second sidelink resource. Alternatively and/or additionally, the first device may be scheduled and/or indicated with the second sidelink resource (e.g., the first device may receive a signal that schedules and/or indicates the second sidelink resource). In step 910, the first device performs a sidelink resource selection/re-selection procedure to select a first sidelink resource in the first sidelink resource pool, wherein the first sidelink resource is selected from among candidate sidelink resources, of the first sidelink resource pool, that are not in the first sidelink slot. For example, the first device may prevent selection of a sidelink resource in the first sidelink slot (e.g., the first device may prevent selection of any sidelink resource in the first sidelink slot) as the first sidelink resource. In step 915, the first device performs a first sidelink transmission on the first sidelink resource.

In one embodiment, the performing the sidelink resource selection/re-selection procedure comprises excluding one or more candidate sidelink resources, that are in the first sidelink resource pool and are in the first sidelink slot, from the candidate sidelink resources from which the first sidelink resource is selected. For example, the performing the sidelink resource selection/re-selection procedure may comprise excluding all candidate sidelink resources, that are in the first sidelink resource pool and are in the first sidelink slot, from the candidate sidelink resources from which the first sidelink resource is selected.

In one embodiment, the first device performs the sidelink resource selection/re-selection procedure after the first device determines the second sidelink resource. For example, the first device may perform the sidelink resource selection/re-selection procedure to select the first sidelink resource after the first device selects the second sidelink resource or after the first device is scheduled and/or indicated with the second sidelink resource.

In one embodiment, the second sidelink resource is in the first sidelink resource pool.

In one embodiment, the first device has a configuration of a second sidelink resource pool in the carrier/cell, and the second sidelink resource is in the second sidelink resource pool.

In one embodiment, the first sidelink transmission is performed to deliver/transmit a first data packet. For example, the first sidelink resource may be selected and/or utilized for delivering/transmitting the first data packet. In some examples, the second sidelink resource is selected and/or utilized for delivering/transmitting a second data packet, and/or a first priority of the first data packet is lower than (e.g., relatively lower than) a second priority of the second data packet.

In one embodiment, the determining the second sidelink resource comprises selecting the second sidelink resource within a resource selection window.

In one embodiment, the first device receives a sidelink grant from a network node or a second device (e.g., the sidelink grant may be transmitted to the first device). The sidelink grant schedules and/or indicates the second sidelink resource. For example, the first device may be scheduled and/or indicated with the second sidelink resource via the sidelink grant. The determining the second sidelink resource is based upon the sidelink grant.

In one embodiment, the first device receives a sidelink control information. The determining the second sidelink resource is based upon the sidelink control information, wherein the sidelink control information indicates the second sidelink resource, and/or wherein a destination identity in the sidelink control information is associated with one or more devices comprising the first device.

Referring back to FIGS. 3 and 4, in one exemplary embodiment of a first device, the device 300 includes a program code 312 stored in the memory 310. The CPU 308 could execute program code 312 to enable the first device (i) to determine a second sidelink resource in a first sidelink slot in a carrier/cell, wherein the first device has a configuration of a first sidelink resource pool in the carrier/cell, (ii) to perform a sidelink resource selection/re-selection procedure to select a first sidelink resource in the first sidelink resource pool, wherein the first sidelink resource is selected from among candidate sidelink resources, of the first sidelink resource pool, that are not in the first sidelink slot, and (iii) to perform a first sidelink transmission on the first sidelink resource. Furthermore, the CPU 308 can execute the program code 312 to perform one, some and/or all of the above-described actions and steps and/or others described herein.

Figure 10:
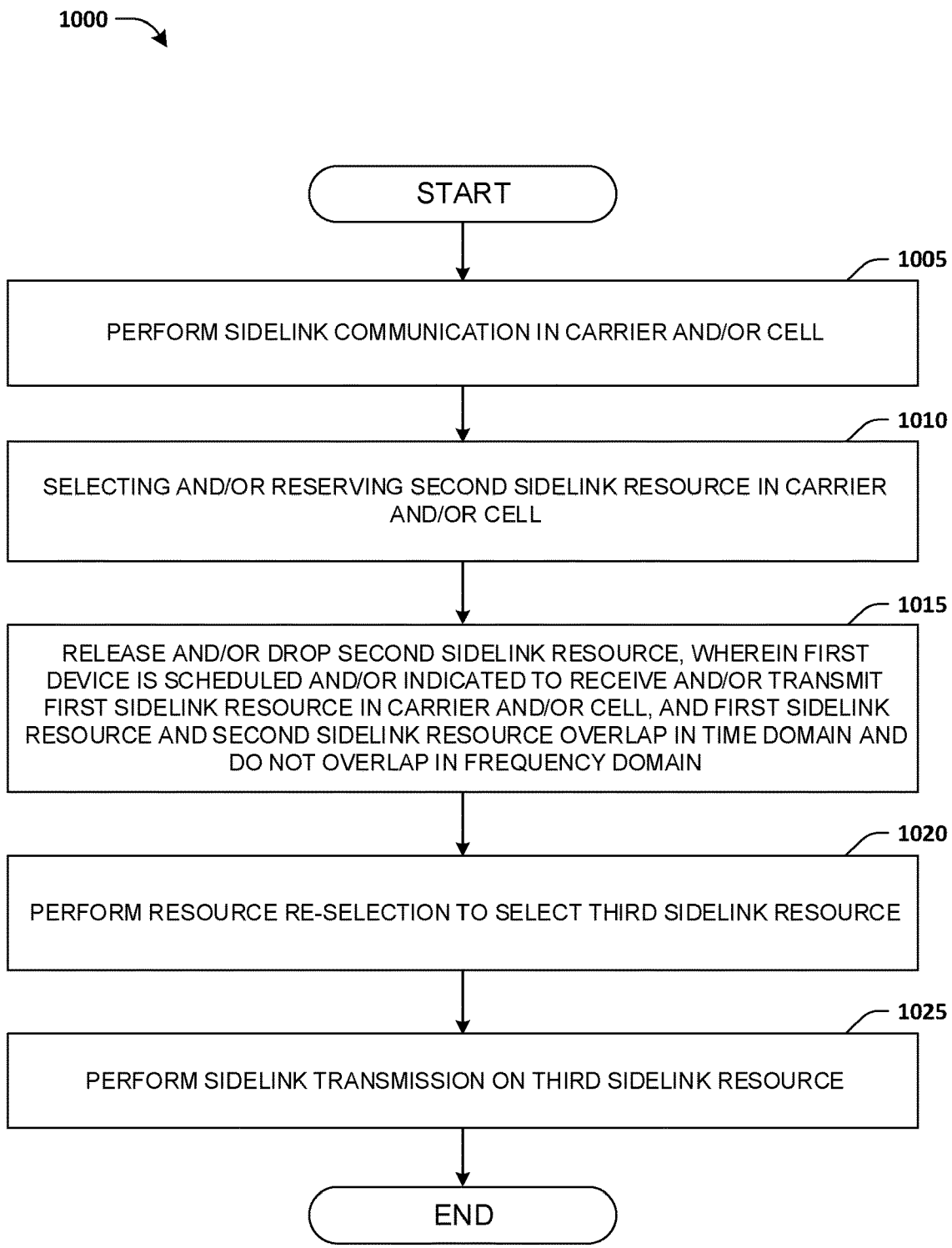
FIG. 10 is a flow chart according to one exemplary embodiment.

FIG. 10 is a flow chart 1000 according to one exemplary embodiment from the perspective of a first device. In step 1005, the first device performs sidelink communication in a carrier/cell. In step 1010, the first device selects and/or reserves a second sidelink resource in the carrier/cell. In step 1015, the first device releases and/or drops the second sidelink resource, wherein the first device is scheduled and/or indicated (and/or instructed) to receive and/or transmit a first sidelink resource in the carrier/cell. The first sidelink resource and the second sidelink resource overlap (e.g., fully or partially overlap) in time domain and do not overlap in frequency domain. For example, the first device may release and/or drop reservation of the second sidelink resource. In step 1020, the first device performs resource re-selection (e.g., a sidelink resource re-selection procedure) to select a third sidelink resource. In step 1025, the first device performs a sidelink transmission on the third sidelink resource.

In one embodiment, the third sidelink resource is selected to replace the second sidelink resource.

In one embodiment, the first device selects and/or reserves the second sidelink resource before the first device is scheduled and/or indicated (and/or instructed) to receive and/or transmit the first sidelink resource.

In one embodiment, the first sidelink resource is utilized (and/or selected) for delivering/transmitting and/or receiving a first data packet, and the second sidelink resource is selected and/or reserved for delivering/transmitting a second data packet. The third sidelink resource is selected and/or utilized for delivering/transmitting the second data packet, and/or a first priority of the first data packet is higher than (e.g., relatively higher than) a second priority of the second data packet.

In one embodiment, the first device receives a sidelink grant from a network node or a second device (e.g., the sidelink grant may be transmitted to the first device), wherein the sidelink grant schedules and/or indicates the first sidelink resource.

In one embodiment, the first device receives a sidelink control information, wherein the sidelink control information reserves and/or indicates the first sidelink resource, and/or wherein a destination identity in the sidelink control information is associated with one or more devices comprising the first device.

In one embodiment, the first sidelink resource and the second sidelink resource are in the same sidelink resource pool in the carrier/cell.

In one embodiment, the first sidelink resource is in a first sidelink resource pool in the carrier/cell and the second sidelink resource is in a second sidelink resource pool in the carrier/cell, wherein the first sidelink resource pool is different from the second sidelink resource pool and/or wherein the first sidelink resource pool is a first NR sidelink resource pool and the second sidelink resource pool is a second NR sidelink resource pool.

Referring back to FIGS. 3 and 4, in one exemplary embodiment of a first device, the device 300 includes a program code 312 stored in the memory 310. The CPU 308 could execute program code 312 to enable the first device (i) to perform sidelink communication in a carrier/cell, (ii) to select and/or reserve a second sidelink resource in the carrier/cell, (iii) to release and/or drop the second sidelink resource, wherein the first device is scheduled and/or indicated to receive and/or transmit a first sidelink resource in the carrier/cell and wherein the first sidelink resource and the second sidelink resource overlap in time domain and do not overlap in frequency domain, (iv) to perform resource re-selection to select a third sidelink resource, and (v) to perform a sidelink transmission on the third sidelink resource. Furthermore, the CPU 308 can execute the program code 312 to perform one, some and/or all of the above-described actions and steps and/or others described herein.

Figure 11:
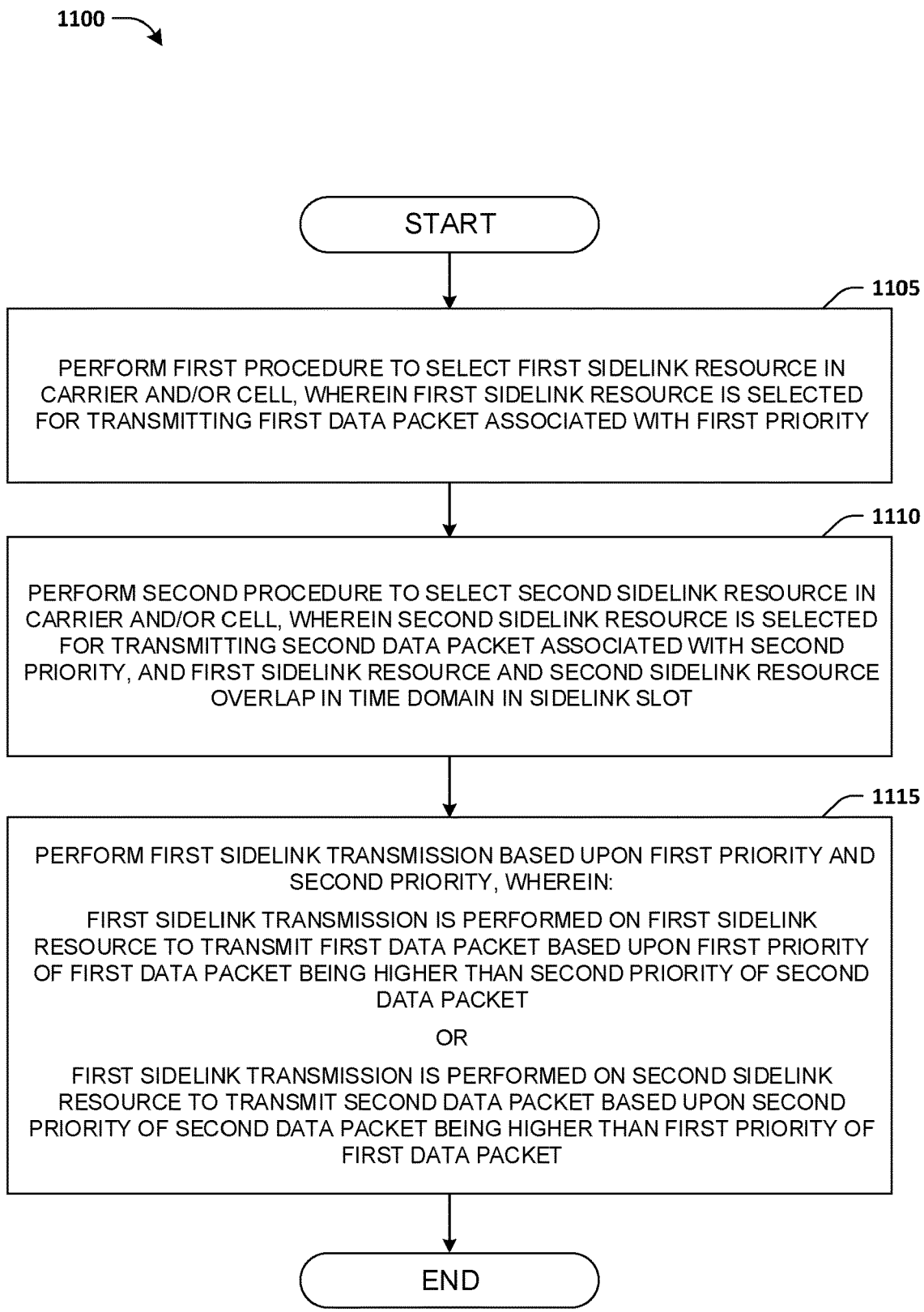
FIG. 11 is a flow chart according to one exemplary embodiment.

FIG. 11 is a flow chart 1100 according to one exemplary embodiment from the perspective of a first device. In step 1105, the first device performs a first sidelink resource selection/re-selection procedure to select a first sidelink resource in a carrier/cell, wherein the first sidelink resource is selected (and/or utilized) for delivering/transmitting a first data packet associated with a first priority. In step 1110, the first device performs a second sidelink resource selection/re-selection procedure for selecting a second sidelink resource in the carrier/cell, wherein the second sidelink resource is selected (and/or utilized) for delivering/transmitting a second data packet associated with a second priority. The first sidelink resource and the second sidelink resource overlap (e.g., fully or partially overlap) in time domain in a sidelink slot. In step 1115, the first device performs a first sidelink transmission based upon the first priority and the second priority. The first sidelink transmission is performed on the first sidelink resource to deliver/transmit the first data packet based upon the first priority of the first data packet being higher than (e.g., relatively higher than) the second priority of the second data packet. The first sidelink transmission is performed on the second sidelink resource to deliver/transmit the second data packet based upon the second priority of the second data packet being higher than (e.g., relatively higher than) the first priority of the first data packet.

For example, if the first priority of the first data packet is higher than (e.g., relatively higher than) the second priority of the second data packet, the first sidelink transmission is performed on the first sidelink resource to deliver/transmit the first data packet. If the second priority of the second data packet is higher than (e.g., relatively higher than) the first priority of the first data packet, the first sidelink transmission is performed on the second sidelink resource to deliver/transmit the second data packet.

In one embodiment, the first device releases and/or drops the first sidelink resource based upon the second priority of the second data packet being higher than (e.g., relatively higher than) the first priority of the first data packet. The first device releases and/or drops the second sidelink resource based upon the first priority of the first data packet being higher than (e.g., relatively higher than) the second priority of the second data packet.

For example, the first device may release and/or drop the first sidelink resource if the second priority of the second data packet is higher than (e.g., relatively higher than) the first priority of the first data packet. The first device may release and/or drop the second sidelink resource if the first priority of the first data packet is higher than (e.g., relatively higher than) the second priority of the second data packet.

In one embodiment, the first device does not perform a sidelink transmission on the first sidelink resource to deliver/transmit the first data packet based upon the second priority of the second data packet being higher than (e.g., relatively higher than) the first priority of the first data packet. The first device does not perform a sidelink transmission on the second sidelink resource to deliver/transmit the second data packet based upon the first priority of the first data packet being higher than (e.g., relatively higher than) the second priority of the second data packet.

For example, the first device may not perform a sidelink transmission on the first sidelink resource to deliver/transmit the first data packet if the second priority of the second data packet is higher than (e.g., relatively higher than) the first priority of the first data packet. The first device may not perform a sidelink transmission on the second sidelink resource to deliver/transmit the second data packet if the first priority of the first data packet is higher than (e.g., relatively higher than) the second priority of the second data packet.

In one embodiment, the first device performs a second sidelink transmission with scaled transmit power (e.g., reduced transmit power). For example, the first device may perform transmit power scaling to perform the second sidelink transmission (e.g., the first device may reduce transmit power of the second sidelink transmission). The second sidelink transmission is performed on the first sidelink resource to deliver/transmit the first data packet based upon the second priority of the second data packet being higher than (e.g., relatively higher than) the first priority of the first data packet. The second sidelink transmission is performed on the second sidelink resource to deliver/transmit the second data packet based upon the first priority of the first data packet being higher than (e.g., relatively higher than) the second priority of the second data packet.

In an example where the second sidelink transmission is performed with scaled transmit power (e.g., reduced transmit power), the first sidelink transmission may be performed, without performing transmit power scaling (e.g., without reducing transmit power of the first sidelink transmission). In an example, when or if the first sidelink transmission is performed with scaled transmit power (e.g., reduced transmit power), the first device may not perform the second sidelink transmission.

Referring back to FIGS. 3 and 4, in one exemplary embodiment of a first device, the device 300 includes a program code 312 stored in the memory 310. The CPU 308 could execute program code 312 to enable the first device (i) to perform a first sidelink resource selection/re-selection procedure to select a first sidelink resource in a carrier/cell, wherein the first sidelink resource is selected (and/or utilized) for delivering/transmitting a first data packet associated with a first priority, (ii) to perform a second sidelink resource selection/re-selection procedure for selecting a second sidelink resource in the carrier/cell, wherein the second sidelink resource is selected (and/or utilized) for delivering/transmitting a second data packet associated with a second priority, and wherein the first sidelink resource and the second sidelink resource overlap (e.g., fully or partially overlap) in time domain in a sidelink slot, and (iii) to perform a first sidelink transmission based upon the first priority and the second priority, wherein the first sidelink transmission is performed on the first sidelink resource to deliver/transmit the first data packet based upon the first priority of the first data packet being higher than (e.g., relatively higher than) the second priority of the second data packet, or the first sidelink transmission is performed on the second sidelink resource to deliver/transmit the second data packet based upon the second priority of the second data packet being higher than (e.g., relatively higher than) the first priority of the first data packet. Furthermore, the CPU 308 can execute the program code 312 to perform one, some and/or all of the above-described actions and steps and/or others described herein.

A device (e.g., a communication device, a UE, a vehicle UE, a V2X UE, a base station, a network node, a RSU, etc.) may be provided, wherein the device may comprise a control circuit, a processor installed in the control circuit and/or a memory installed in the control circuit and coupled to the processor. The processor may be configured to execute a program code stored in the memory to perform method steps illustrated in FIGS. 7-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 7-11, and/or one, some and/or all of the above-described actions and steps and/or others described herein.

It may be appreciated that applying one or more of the techniques presented herein may result in one or more benefits including, but not limited to, enabling a first device to avoid and/or handle occurrence of NR PSSCH TX/TX overlap and/or NR PSSCH TX/RX overlap, which provides for increased efficiency of communication between devices (e.g., devices comprising at least one of one or more UEs, one or more vehicle UEs, one or more V2X UEs, one or more network nodes, one or more base stations, etc.). The increased efficiency may be a result of inhibiting and/or preventing resource collision and/or interference with other devices.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-read-

The invention claimed is:

1. A method of a first device for performing sidelink communication, the method comprising:
   determining a second sidelink resource in a first Transmission Time Interval (TTI) in at least one of a carrier or a cell, wherein the first device has a configuration of a first sidelink resource pool in at least one of the carrier or the cell;
   performing a procedure to select a first sidelink resource in the first sidelink resource pool, wherein:
      the first sidelink resource is selected from among candidate sidelink resources, of the first sidelink resource pool, that are not in the first TTI; and
      the procedure is at least one of a sidelink resource selection procedure or a sidelink resource re-selection procedure; and
   performing a first sidelink transmission on the first sidelink resource.

2. The method of claim 1, wherein:
   the performing the procedure comprises excluding one or more candidate sidelink resources, that are in the first sidelink resource pool and are in the first TTI, from the candidate sidelink resources from which the first sidelink resource is selected.

3. The method of claim 1, wherein:
   the performing the procedure is performed after the determining the second sidelink resource.

4. The method of claim 1, wherein:
   the second sidelink resource is in the first sidelink resource pool.

5. The method of claim 1, wherein:
   the first device has a configuration of a second sidelink resource pool in at least one of the carrier or the cell; and
   the second sidelink resource is in the second sidelink resource pool.

6. The method of claim 1, wherein:
   the first sidelink transmission is performed to transmit a first data packet; and
   at least one of:
      the second sidelink resource is at least one of selected or utilized for transmitting a second data packet; or
      a first priority of the first data packet is lower than a second priority of the second data packet.

7. The method of claim 1, wherein:
   the determining the second sidelink resource comprises selecting the second sidelink resource within a resource selection window.

8. The method of claim 1, comprising:
   receiving a sidelink grant from a network node or a second device, wherein:
      the sidelink grant at least one of schedules or indicates the second sidelink resource; and
      the determining the second sidelink resource is based upon the sidelink grant.

9. The method of claim 1, comprising:
   receiving a sidelink control information, wherein the determining the second sidelink resource is based upon the sidelink control information, wherein at least one of:
      the sidelink control information indicates the second sidelink resource; or
      a destination identity in the sidelink control information is associated with one or more devices comprising the first device.

10. A method of a first device, the method comprising:
    performing sidelink communication in at least one of a carrier or a cell;
    at least one of selecting or reserving a second sidelink resource in at least one of the carrier or the cell;
    at least one of releasing or dropping the second sidelink resource, wherein:
       the first device is at least one of scheduled or indicated to at least one of receive or transmit a first sidelink resource in at least one of the carrier or the cell; and
       the first sidelink resource and the second sidelink resource overlap in time domain and do not overlap in frequency domain;
    performing resource re-selection to select a third sidelink resource; and
    performing a sidelink transmission on the third sidelink resource.

11. The method of claim 10, wherein:
    the third sidelink resource is selected to replace the second sidelink resource.

12. The method of claim 10, wherein:
    the at least one of the selecting or the reserving the second sidelink resource is performed before the first device is at least one of scheduled or indicated to at least one of receive or transmit the first sidelink resource.

13. The method of claim 10, wherein:
    the first sidelink resource is utilized for at least one of transmitting or receiving a first data packet;
    the second sidelink resource is at least one of selected or reserved for transmitting a second data packet; and
    at least one of:
       the third sidelink resource is at least one of selected or utilized for transmitting the second data packet; or
       a first priority of the first data packet is higher than a second priority of the second data packet.

14. The method of claim 10, comprising:
    receiving a sidelink grant from a network node or a second device, wherein the sidelink grant at least one of schedules or indicates the first sidelink resource.

15. The method of claim 10, comprising:
    receiving a sidelink control information, wherein at least one of:
       the sidelink control information at least one of reserves or indicates the first sidelink resource; or
       a destination identity in the sidelink control information is associated with one or more devices comprising the first device.

16. The method of claim 10, wherein:
    the first sidelink resource and the second sidelink resource are in the same sidelink resource pool in at least one of the carrier or the cell.

17. The method of claim 10, wherein:
    the first sidelink resource is in a first sidelink resource pool in at least one of the carrier or the cell;
    the second sidelink resource is in a second sidelink resource pool in at least one of the carrier or the cell; and at least one of:
  the first sidelink resource pool is different from the second sidelink resource pool; or
  the first sidelink resource pool is a first New Radio (NR) sidelink resource pool and the second sidelink resource pool is a second NR sidelink resource pool.

18. A method of a first device for performing sidelink communication, the method comprising:
  performing a first procedure to select a first sidelink resource in at least one of a carrier or a cell, wherein:
    the first sidelink resource is selected for transmitting a first data packet associated with a first priority; and
    the first procedure is at least one of a first sidelink resource selection procedure or a first sidelink resource re-selection procedure;
  performing a second procedure to select a second sidelink resource in at least one of the carrier or the cell, wherein:
    the second sidelink resource is selected for transmitting a second data packet associated with a second priority;
    the second procedure is at least one of a second sidelink resource selection procedure or a second sidelink resource re-selection procedure; and
    the first sidelink resource and the second sidelink resource overlap in time domain in a Transmission Time Interval (TTI);
  performing a first sidelink transmission based upon the first priority and the second priority, wherein:
    the first sidelink transmission is performed on the first sidelink resource to transmit the first data packet based upon the first priority of the first data packet being higher than the second priority of the second data packet; or
    the first sidelink transmission is performed on the second sidelink resource to transmit the second data packet based upon the second priority of the second data packet being higher than the first priority of the first data packet.

19. The method of claim 18, comprising at least one of:
  one of:
    at least one of releasing or dropping the first sidelink resource based upon the second priority of the second data packet being higher than the first priority of the first data packet; or
    at least one of releasing or dropping the second sidelink resource based upon the first priority of the first data packet being higher than the second priority of the second data packet; or
  one of:
    not performing a sidelink transmission on the first sidelink resource to transmit the first data packet based upon the second priority of the second data packet being higher than the first priority of the first data packet; or
    not performing a sidelink transmission on the second sidelink resource to transmit the second data packet based upon the first priority of the first data packet being higher than the second priority of the second data packet.

20. The method of claim 18, comprising:
  performing a second sidelink transmission with scaled transmit power, wherein:
    the second sidelink transmission is performed on the first sidelink resource to transmit the first data packet based upon the second priority of the second data packet being higher than the first priority of the first data packet; or
    the second sidelink transmission is performed on the second sidelink resource to transmit the second data packet based upon the first priority of the first data packet being higher than the second priority of the second data packet.

* * * * *